US012621148B2

(12) United States Patent
Li et al.

(10) Patent No.: US 12,621,148 B2
(45) Date of Patent: May 5, 2026

(54) SYSTEM AND METHOD FOR PERFORMING OPERATION USING LINEAR-INTEGER-PROGRAMING FOR RSA FACTORIZATION

(71) Applicant: City University of Hong Kong, Hong Kong (HK)

(72) Inventors: Han-Lin Li, Hong Kong (HK); Way Kuo, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 164 days.

(21) Appl. No.: 18/437,201

(22) Filed: Feb. 8, 2024

(65) Prior Publication Data

US 2025/0260571 A1 Aug. 14, 2025

(51) Int. Cl.
H04L 9/30 (2006.01)
(52) U.S. Cl.
CPC ............ H04L 9/302 (2013.01); H04L 9/3033 (2013.01)
(58) Field of Classification Search
CPC .............................. H04L 9/302; H04L 9/3033
See application file for complete search history.

(56) References Cited

U.S. PATENT DOCUMENTS

| | | |
|---|---|---|
| 11,456,863 B1 | 9/2022 | Conor |
| 2020/0304306 A1* | 9/2020 | Cheung ..................... H04L 9/14 |

| | | | |
|---|---|---|---|
| 2021/0344476 A1* | 11/2021 | Bezzateev ............. | H04L 9/3247 |
| 2022/0166618 A1* | 5/2022 | Grant ..................... | H04L 9/3033 |
| 2024/0235834 A1* | 7/2024 | Grant ..................... | H04L 9/3066 |
| 2025/0094524 A1* | 3/2025 | Kim ........................... | G06F 5/01 |

OTHER PUBLICATIONS

R. L. Rivest et al., "A Method for Obtaining Digital Signatures and Public-key Cryptosystems," Communications of the ACM, 1978, vol. 21(2), p. 120-126.
Alan G. Konheim, "Computer Security and cryptography," Wiley-Interscience, A John Wiley & Sons, inc., Publication, 2007, p. 1-536.
Shi Bai et al., "Factorisation of RSA-220 With CADO-NFS," https://members.loria.fr/PZimmermann/papers/rsa220.pdf, 2016, p. 1-3.

(Continued)

*Primary Examiner* — Rupal Dharia
*Assistant Examiner* — Devin E Almeida
(74) *Attorney, Agent, or Firm* — Idea Intellectual Limited; Sam T. Yip

(57) ABSTRACT

A system for performing operations using linear integer programming for RSA factorization is provided, including an n/e extractor, a prime factorization calculator, a private key determiner, and a decryptor. The n/e extractor is configured to extract a modulus and a public key exponent from a public key. The prime factorization calculator is configured to: determine a semi-prime number of the modulus according to the modulus; use a tail digit and a head digit set of the semi-prime number of the modulus to perform decomposition and factorization with respect to the semi-prime number into two prime factors. The private key determiner is configured to determine a private key using the public key exponent and the two prime numbers. The decryptor is configured to decrypt an encrypted message using the private key so as to generate a decrypted message.

12 Claims, 3 Drawing Sheets

(56) References Cited

OTHER PUBLICATIONS

Peter W. Shor, "Polynomial-time algorithms for prime factorization and discrete logarithms on a quantum computer," Siam Review, 1999, vol. 41, No. 2, pp. 303-332.

Claus Peter Schnorr, "Fast factoring integers by SVP algorithms, corrected," Cryptology ePrint Archive, 2021, p. 1-12.

Claus Peter Schnorr, "Factoring Integers by CVP algorithms," Number Theory and Cryptography, 2013, p. 73-93.

Brandon Dixon et al., "Factoring Integers using SIMD Sieves," Lecture Notes in Computer Science, 1994, vol. 765, pp. 28-39.

J. M. Polland, "The Lattice Sieve," Lecture Notes in Mathematics, 1993, vol. 1554, p. 43-44.

Alfred J. Menezes et al., "Elliptic curve cryptosystems and their implementation," Journal of Cryptology, 1993, vol. 6, p. 209-224.

\* cited by examiner

SYSTEM AND METHOD FOR PERFORMING OPERATION USING LINEAR-INTEGER-PROGRAMING FOR RSA FACTORIZATION

TECHNICAL FIELD

The present invention generally relates to the field of public-key encryption and digital signature, particularly to systems and methods for performing operations using linear integer programming for RSA factorization.

BACKGROUND

A semi-prime number is the product of exactly two different prime numbers. An RSA factorization method is to decompose a semi-prime number into its two prime factors. RSA factorization is an essential technique that is widely used in today's cryptography research such as the RSA public-key encryption and RSA digital signature. Many mathematicians and computer scientists have been developing new RSA factorization methods to secure today's digital communication systems.

Specifically, in RSA encryption, a public key is created from two large prime numbers, and the product of these two primes (a semiprime) is used as part of this key. The security of RSA encryption relies heavily on the computational difficulty of factoring large semiprime numbers. If it is easy to factorize the semiprime, the encryption could be easily broken, rendering the encrypted data insecure. A semiprime factorization calculator could theoretically be used to break RSA encryption by factorizing the semiprime number in the public key to find the original prime numbers. However, in practice, the prime numbers used in RSA encryption are so large (e.g., hundreds of digits) that it is computationally infeasible to factorize the semiprime number with current technology and known algorithms. Therefore, while a semiprime factorization calculator fits into the technical field of encryption/decryption in theory, its practical application for breaking modern encryption is currently limited.

The currently available RSA factorization methods using traditional computers can be casted in three categories. The first category, including the well-known "Trial Sieve method," utilizes the exhaustive brute force techniques. The second category, including the "Pollard's Rho" and "Lenstra Elliptic Curve" methods develops special-purpose quadratic sieve methods. The third one is the general-purpose quadratic sieve category, including the General Number Field Sieve method (GNFS) and Shanks's method. There also exits an RSA factorization method using the quantum computer, which may become scalable in the future.

The above-mentioned RSA factoring methods have their features and limitations described as follows:

To factorize a semi-prime number $\theta$, these methods may not utilize the information of decimal digits, but factorize $\theta$ directly.

These methods employ heuristic techniques, which may not converge to a final feasible solution. For example, the feasibility of GNFS method depends on how to specify the two polynomial functions involved, and the Pollard Rho method is a probabilistic algorithm with no guarantee to find a feasible solution.

To factorize a semi-prime number $\theta$, a typical sieve method needs to know the prime numbers smaller than $\sqrt{\theta}$ beforehand. For instance, the GNFS method spends more than half of its computing time (e.g., more than 50%) in detecting if a number is smooth or not. It is noted that a number is called B-smooth if all factors of the number are not larger than a number B.

Some of these methods can only factorize a semi-prime number $\theta$ with certain specific structure. For instance, SNFS can only factorizing $\theta$ with limited smoothness values.

Some of these methods, such as the Trial Division, Wheel Factorization, Pollard's Rho, and Elliptic Curve methods are special-purpose factoring algorithms, whose running time depends on the size of the smallest prime factor of $\theta$.

Special-purpose factorization algorithms are usually applied to remove small factors before employing the General Quadratic Sieve method.

Therefore, there is a need to develop systems and methods for performing RSA factorization operations to address the challenges and shortcomings of the currently applied RSA factorization approaches.

SUMMARY OF INVENTION

It is an objective of the present invention to provide systems and methods for performing operations using linear integer programming for RSA factorization to address the aforementioned shortcomings and unmet needs in the state of the art.

To overcome the shortcomings of the current available RSA factorization methods, the present disclosure develops a novel RSA factorization approach, called Linear-Integer-Programming (LIP) method, for factorizing semi-prime numbers. The features of the LIP method are given in the following:

(i) To factorize a semi-prime primal $\theta$ with $\lambda+2$ decimal digits, LIP utilizes the decimal digit information of $\theta$ to formulate several subproblems in linear integer programming models with A equations and $10\lambda$ binary variables. Solving the resulting subproblems leads to the factorization of $\theta$ into two primes. This is totally different from the known methods, which do not use any of the decimal digit information of $\theta$.

(ii) LIP is an exact method that can factorize any given semi-prime number into two exact primes without exception. It is different from the existing heuristic methods, which may not converge to a feasible solution.

(iii) To factorize a semi-prime number $\theta$, the LIP method does not require the information of all primes smaller than $\sqrt{\theta}$.

(iv) LIP can factorize any given semi-prime number $\theta$ without asking $\theta$ to fit any required structure.

(v) LIP does not require the use of any specific software to factorize $\theta$. Any commercially available linear integer programming solver can be utilized to factorize a given semi-prime number $\theta$.

The strategy/key steps of developing the LIP method are described as follows:

(i) (Standard Expression) Given a semi-prime number $\theta$ in $1+2$ decimal digits. Without loss of generality, in the decibel system, it can be assumed that A is an even number and $$\theta = \sum_{j=0}^{\lambda} a_j \times 10^j,$$

where $a_j \in \{0, 1, \ldots, 9\}$, for $j=0, 1, \ldots, \lambda-1$, and $a_\lambda \{0, 1, \ldots, 99\}$.

Example 1: For $\theta=123456$, there is $\lambda=4$, $a_0=6$, $a_1=5$, $a_2=4$, $a_3=3$, $a_4=12$, and $\theta=12\times10^4+3\times10^3+4\times10^2+5\times10^1+6\times10^0$. For $\theta=12345=012345$, there is $\lambda=4$, $a_0=5$, $a_1=4$, $a_2=3$, $a_3=2$, $a_4=1$, and $\theta=1\times10^4+2\times10^3+3\times10^2+4\times10^1+5\times10^0$.

In other words, for $\theta>0$ in d>2 digits, if d is odd, then $\lambda=d-1$; otherwise, $\lambda=d-2$.

(ii) (Classification) It is to classify a semi-prime $\theta$ as a Type-1, Type-2, or Type-3 semi-prime number in the following way: (a) if $\theta=p_i\times p_j$, with $p_i$ and $p_j$ being 4k+1 primes, then $\theta$ is a type-1 semi-prime; (b) if $\theta=q_i\times q_j$ with $q_i$ and $q_j$ being 4k+3, then $\theta$ is a Type-2 semi-prime; (c) if $\theta=p_i\times q_j$, with $p_i$ and $q_j$ being 4k+1 and 4k+3 primes, respectively, then $\theta$ is a type-3 semi-prime, where $k\in N_+$.

(iii) (Representation) If $\theta$ is a Type-1 semi-prime, then there exist positive even integers m, $\overline{m}$ and odd integers n, $\overline{n}$ such that $\theta=m^2+n^2=\overline{m}^2+\overline{n}^2=4k+1$. For example, Type-1 $\theta=221=13\times17=10^2+11^2=14^2+5^2$.

If $\theta$ is a Type-2 semi-prime, then there exist positive integers m and n (m even, n odd, and n>m) such that $\theta=n^2-m^2=4k+3$. For example, Type-2 $\theta=77=7\times11=9^2-2^2$.

If $\theta$ is a Type-3 semi-prime, then there exist positive integers m and n (m even, n odd, and m>n) such that $\theta=m^2-n^2=4k+1$. For example, Type-3 $\theta=143=13\times11=12^2-1^2$.

(iv) (Decomposition) Based on the digit-values of $a_0$ and $a_\lambda$, it is to decompose the main problem into several subproblems. Each subproblem is formulated as a linear integer programming problem with $\lambda$ equations and $10\lambda$ binary variables.

(v) (Factorization) upon solving the corresponding linear binary programs to obtain m and n, then the exact factors of $\theta$ can be found accordingly.

In embodiments of the present disclosure, for a given semi-prime number $$\theta = \sum\nolimits_{j=0}^{\lambda} a_j \times 10^j$$

($\lambda\theta$ is even), all decimal digits (from the tail digit $a_0$ to the head two-digits $a_\lambda$) are used to form subproblems for consideration. Hence, the approach can be called the "Linear-Integer-Programming" (LIP) method.
wherein In accordance with a first aspect of the present invention, a system for reducing computer processing time during private key decryption during digital communication is provided. The system can perform operations using linear integer programming for RSA factorization, including an n/e extractor, a prime factorization calculator, a private key determiner, and a decryptor. The n/e extractor is configured to extract a modulus and a public key exponent from a public key. The prime factorization calculator is electrically coupled with the n/e extractor and is configured to: determine a semi-prime number of the modulus according to the modulus; use a tail digit and a head digit set of the semi-prime number of the modulus to perform decomposition and factorization with respect to the semi-prime number into two prime factors via one of a first mode, a second mode, and a third mode, in which the tail digit represents the last or least significant digit of the semi-prime number, and the head digit set represents the first two or most significant digits of the semi-prime number. The private key determiner is electrically coupled with the prime factorization calculator and is configured to determine a private key using the public key exponent and the two prime numbers. The decryptor is electrically coupled with the private key determiner and is configured to decrypt an encrypted message using the private key so as to generate a decrypted message.

In accordance with a second aspect of the present invention, a method for reducing computer processing time during private key decryption during digital communication is provided. The method is set for performing operations using linear integer programming for RSA factorization, including steps as follows: extracting a modulus and a public key exponent from a public key; determining a semi-prime number of the modulus according to the modulus; using a tail digit and a head digit set of the semi-prime number of the modulus to perform decomposition and factorization with respect to the semi-prime number into two prime factors via one of a first mode, a second mode, and a third mode, wherein the tail digit represents the last or least significant digit of the semi-prime number, and the head digit set represents the first two or most significant digits of the semi-prime number; determining a private key using the public key exponent and the two prime numbers;

and decrypting an encrypted message using the private key, so as to generate a decrypted message.

Specifically, the method can be expressed as the follows. (1): factor a given semi-prime $$\theta = \sum\nolimits_{j=0}^{\lambda} a_j 10^j$$

into two primes, by solving $\lambda+1$ linear integer equations based on digital values $a_0, a_1, a_2, \ldots, a_n$; where $\lambda\theta$ is even and $a_j$ are non-negative integers. (2) Let $$X = \sum\nolimits_{j=1}^{\lambda} x_j 10^j, \text{ and } Y = \sum\nolimits_{j=1}^{\lambda} y_j 10^j.$$

The solutions of factoring $\theta$ are expressed as:

(i) $\theta=X^2+Y^2$, if $\theta=4k+1$ and $\theta$ is the product of the 4k+1 primes.

(ii) $\theta=Y^2-X^2$, if $\theta=4k+1$ and $\theta$ is the product of the 4k+3 primes.

(iii) $\theta=X^2-Y^2$, if $\theta=4k+3$ and $\theta$ is the product of one 4k+1 prime and one 4k+3 prime.

(3A) Generate the equations solvable to obtain X and Y, which are expressed as:

$$x_0^2 + y_0^2 = 10w_0 + a_0$$

$$2\sum\nolimits_{h+d=j}(x_h x_d + y_h y_d) = 10w_j + a_j - w_{j-1}, j = 1, 3, 5, \ldots, \lambda-1,$$

$$2\sum\nolimits_{h+d=j}(x_h x_d + y_h y_d) + x_{\frac{j}{2}}^2 + y_{\frac{j}{2}}^2 =$$

$$10w_j + a_j - w_{j-1}, j = 2, 4, 6, \ldots, \lambda-2,$$

$$x_{\lambda/2}^2 + y_{\lambda/2}^2 = 10w_{\lambda/2-1} + a_\lambda,$$

where $x_h x_d$ and $y_h y_d$ can be linearized in the solution process.

(3B) Generate the equations solvable to obtain X and Y, which are expressed as:

$$y^2 - x_0^2 = 10w_0 + a_0,$$

-continued $$2\sum\nolimits_{h+d=j}(y_h y_d - x_h x_d) = 10w_j - a_j - w_{j-1}, j = 1, 3, ..., \lambda - 1,$$

$$2\sum\nolimits_{h+d=j}(y_h y_d - x_h x_d) + y_{\lambda/2}^2 - x_{\lambda/2}^2 =$$

$$10w_j - a_j - w_{j-1}, j = 2, 4, ..., \lambda - 2,$$

$$y_{\lambda/2}^2 - x_{\lambda/2}^2 = 10w_{\lambda/2-1} + a_\lambda,$$

where $x_h x_d$ and $y_h y_d$ can be linearized in the solution process.

(3C) Generate the equations solvable to obtain X and Y, which are expressed as:

$$x_0^2 - y_0^2 = 10w_0 + a_0,$$

$$2\sum\nolimits_{h+d=j}(x_h x_d - y_h y_d) = 10w_j - a_j - w_{j-1}, j = 1, 3, ..., \lambda - 1,$$

$$2\sum\nolimits_{h+d=j}(x_h x_d - y_h y_d) + x_{\lambda/2}^2 - y_{\lambda/2}^2 =$$

$$10w_j - a_j - w_{j-1}, j = 2, 4, ..., \lambda - 2,$$

where $x_h x_d$ and $y_h y_d$ can be linearized in the solution process.

(4) A parallel programming method can be devised to solve all linear integer equations above.

BRIEF DESCRIPTION OF DRAWINGS

Embodiments of the invention are described in more details hereinafter with reference to the drawings, in which.

DETAILED DESCRIPTION OF THE INVENTION

In the following description, systems and methods for performing operations using linear integer programming for RSA factorization and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

RSA factorization is to decompose a semi-prime number into two prime factors, which is critical in today's public-key encryption. To factorize a semi-prime number θ, most of the currently available RSA factorization methods adopt a heuristic-based quadratic sieve techniques to decompose θ without utilizing much of the valuable decimal digit information inherent in θ. This invention develops a novel approach, called Linear-Integer-Programming (LIP) method, which employs the optimization-based integer programming techniques with the full decimal digit information in θ to decompose any given semi-prime number θ. To factorize a given θ in 1+2 decimals digits, the LIP first uses the tail (last, or least significant) digit and head (first two, or most significant) digits of θ to decompose the original problem into subproblems, then reformulate each subproblem as a linear integer program in λ equations and 10λ binary variables. By solving the resulting linear integer programs using any commercial software, θ can then be effectively factorized into two prime numbers.

Figure 1:
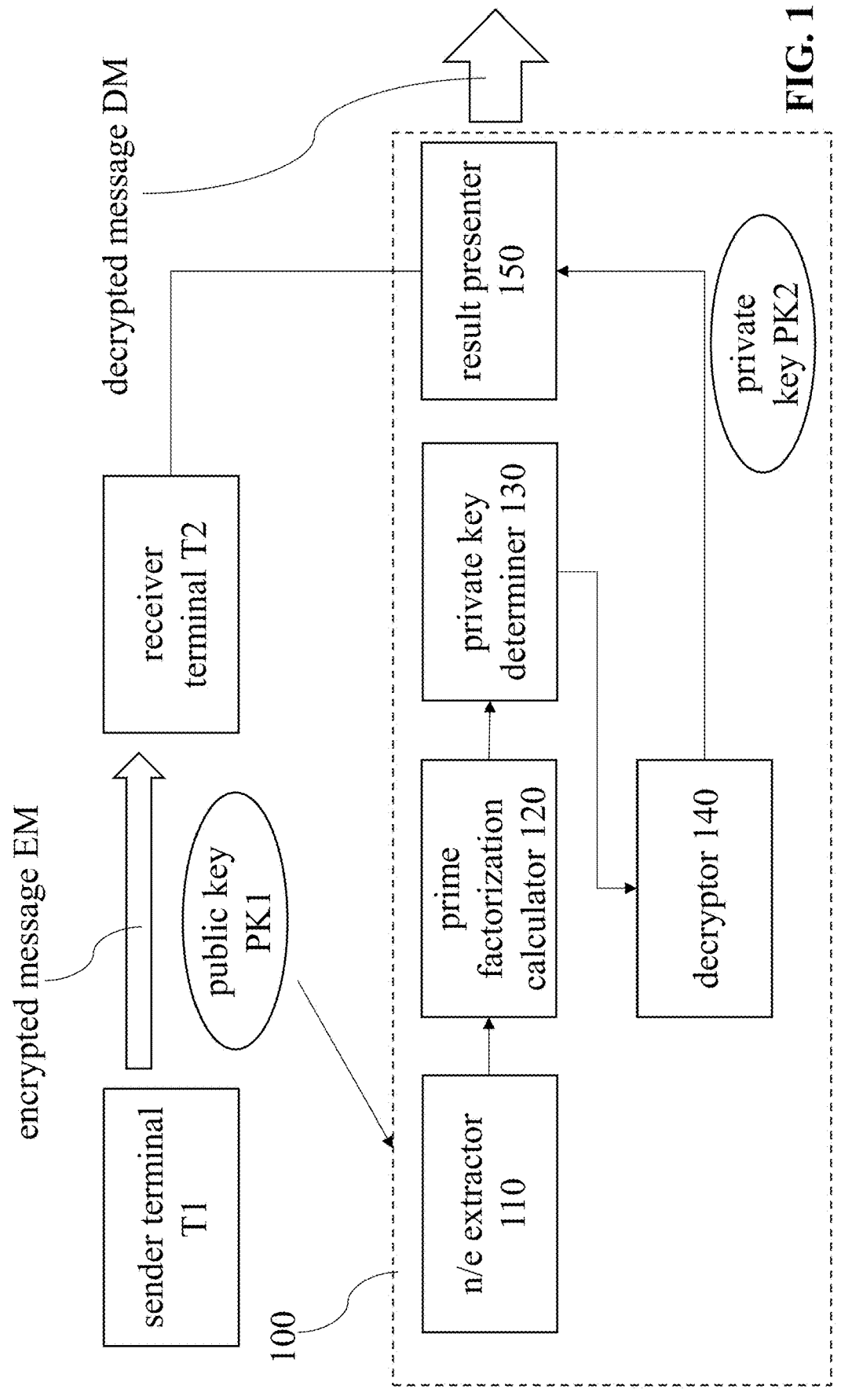
FIG. 1 is a schematic block diagram of a system for performing operations using linear integer programming for RSA factorization according to an embodiment of the present invention.

FIG. 1 shows a schematic diagram of a system 100 for performing operations using linear integer programming for RSA factorization with respect to a sender terminal T1 and a receiver terminal T2 according to an embodiment of the present disclosure. The system 100 is provided for reducing computer processing time and/or computer power consumption during private key decryption during digital communication. The system 100 can act as a decryptor or decryption system, leading to a reduction in computer power consumption during the decryption process. This is achieved by enabling the completion of the decryption process with less computing power by using the system 100.

The sender terminal T1 can send an encrypted message EM to the receiver terminal T2 and receive a public key PK1 from the receiver terminal T2, associated with a private key PK2. In such a case, the public key PK1 may be published and thus obtainable directly or indirectly from the receiver terminal T2 by any participant; however, only the receiver terminal T2 has access to the private key PK2. The system 100 is configured to determine the private key PK2 from the public key PK1 to decrypt the encrypted message EM encrypted using the public key PK1. It can then further use the private key PK2 to decrypt the encrypted message EM, producing a decrypted message DM. Under the condition that the public key PK1 is obtainable by the system 100, the system 100 is able to determine or crack the private key PK2. To achieve it, in one embodiment, the system 100 include an n/e extractor 110, a prime factorization calculator 120, a private key determiner 130, a decryptor 140, and a result presenter 150.

The n/e extractor 110 is configured to extract one or more components of the public key PK1. In this regard, under the construction of Rivest-Shamir-Adleman (RSA) encryption, the public key PK1 contains a modulus n and a public key exponent e that are encoded in an encoded data structure. Correspondingly, in one embodiment, the n/e extractor 110 can extract the modulus n and the public key exponent e from the public key PK1 by a parser, so as to parse the encoded data structure representing the public key PK1.

The prime factorization calculator 120 is electrically coupled with the n/e extractor 110 is configured to receive the components of the public key PK1 from the n/e extractor 110, such as the modulus n, and take the components of the public key PK1 for factoring the modulus n into two prime factors in order to determining the private key PK2. Briefly, to factorize a given θ (e.g., a semi-prime number contained in a modulus n) in λ+2 decimals digits, during determining the private key PK2, the prime factorization calculator 120 can use the tail (last, or least significant) digit and head (first two, or most significant) digits of θ to decompose the original problem into subproblems, then reformulate each subproblem as a linear integer program in λ equations and 10λ binary variables. By solving the resulting linear integer programs, θ can then be effectively factorized into two prime numbers, so as to determine the private key PK2.

The private key determiner 130 is electrically coupled with the prime factorization calculator 120 and is configured to determine the private key PK2 using the public key exponent e and the two prime numbers obtained from the prime factorization calculator 120 factoring the modulus n. In the RSA cryptosystem, the private key PK2 shares the same modulus n as the public key PK1 but has a private key exponent d distinct from the public key exponent e. The private key determiner 130 derives the private key exponent d of the private key PK2 by utilizing the two prime numbers obtained from the prime factorization calculator 120. It uses these prime numbers to calculate the private key exponent d through specialized programs within the RSA cryptosystem, ensuring a distinct private key exponent from the public key exponent e. For example, once the modulus n of the public key and its two prime factors p and q are obtained, it can derive the private key d by calculating Euler's totient function, selecting the public key exponent e, and then computing the private key exponent d.

The decryptor 140 is electrically coupled with the private key determiner 130 and is configured to decrypt the encrypted message EM using the private key PK2 determined by the private key determiner 130. The decryptor 140 can analyze an encoded data structure representing the encrypted message EM, so as to parse the encoded data structure and accordingly extract a ciphertext c to be decrypted using the private key PK2 For example, as the encrypted message EM is represented as a base64-encoded string, the decryptor 140, through its analysis, can decode this string to obtain the ciphertext c, which is then subjected to decryption using the private key PK2. With the ciphertext c, the modulus n, and the private key exponent d determined by the private key determiner 130, the decryptor can successfully decrypt the ciphertext c.

The result presenter 150 is electrically coupled with the decryptor 140 and is configured to collect information from the decryptor 140 regarding the decrypted result, operating after the decryptor 140 successfully decrypts the encrypted message EM using the private key PK2 determined by the private key determiner 130. The result presenter 150 is electrically coupled with the receiver terminal T2, once the decryption process is completed and thus the decrypted message DM is generated/obtained, the result presenter 150 can extract relevant details from the decrypted message DM, presenting information about the original encrypted message EM, such as its content, metadata, or any associated data. The result presenter 150 can enhance the overall functionality by providing an interface to access and display decrypted message information after the decryption process is carried out by the decryptor 140.

In one embodiment, the prime factorization calculator 120 can program operations, including standard expression, classification, representation, decomposition, and factorization, so as to factor the modulus n into two prime factors, which are described in more detail below.

Remarks, propositions, and examples are provided to prove the prime factorization calculator 120 can achieve the factoring function. All prime numbers are positive odd numbers. There are two kinds of positive odd numbers, namely, the 4k+1 (k=1, 2, . . . ) integers and 4k+3 (k=0, 1, 2, . . . ) integers. When prime numbers are concerned, there are 4k+1 primes and 4k+3 primes. For instance, 5, 13, 17, 29 and 37 are 4k+1 primes, and 3, 7, 11, 19 and 23 are 4k+3 primes.

Remark 1: Denote $p_i$ as the $i^{th}$ 4k+1 prime, and denote $q_j$ as the $j^{th}$ 4k+3 prime. For instance, $p_1$=5, $p_2$=13, $p_{3=17}$, $q_1$=3, $q_2$=7, $q_3$=11.

Remark 2: An integer θ>0 is called a semi-prime number, if θ is the product of two different primes. There are three types of semi-prime numbers:

(i) θ is a Type-1 semi-prime, if θ is the product of two 4k+1 primes. For instance, θ=221=13×17 is a Type-1 semi-prime. In this case, θ is a 4k+1 integer.

(ii) θ is a Type-2 semi-prime, if θ is the product of two 4k+3 primes. For 4k+1 instance, θ=7×11=77 is a Type-2 semi-prime. In this case, θ is also a 4k+1 integer.

(iii) θ is a Type-3 semi-prime, if θ is the product of one 4k+1 prime and one 4k+3 prime. In this case, θ is a 4k+3 integer. For instance, θ=13×11=143 is a Type-3 semi-prime.

Proposition 1

For a semi-prime number θ, the followings statements are true:

(i) If θ is in the form of 4k+1, then either θ is a Type-1 semi-prime such that θ=$p_i$×$p_j$ with $p_i$, $p_j$ being 4k+1 primes, or θ is a Type-2 semi-prime such that θ=$q_i$×$q_j$ with $q_i$, $q_j$ being 4k+3 primes.

(ii) If θ is in the form of 4k+3, then θ is a Type-3 semi-prime such that θ=$p_i$×$q_j$ with $p_i$ being a 4k+1 prime and $q_j$ being a 4k+3 prime.

Proposition 2

Let θ be a Type-1 semi-prime, then the following statements are true:

(i) There exist positive integers m, n, $\overline{m}$, $\overline{n}$ with m>$\overline{m}$ being even and n<$\overline{n}$ being odd such that θ=$m^2$+$n^2$=$\overline{m}^2$+$\overline{n}^2$.

(ii) Take 2a=gcd(m−$\overline{m}$, $\overline{n}$−n), 2b=gcd(m+$\overline{m}$, n+$\overline{n}$), 2c=gcd (m−$\overline{m}$, n+$\overline{n}$), and 2d=gcd(m+$\overline{m}$, $\overline{n}$−n).

Set $p_i$=$a^2$+$b^2$, $p_j$=$c^2$+$d^2$, then $p_i$ and $p_j$ are 4k+1 primes and $p_i$×$p_j$=θ.

Example 2: Consider θ=221=13×17. there is, m=14, $\overline{m}$=10, n=5, $\overline{n}$=11, $$a = \frac{1}{2}gcd(14 - 10, 11 - 5) = 1, \quad b = \frac{1}{2}gcd(14 + 10, 5 + 11) = 4,$$

$$c = \frac{1}{2}gcd(14 - 10, 5 + 11) = 2, \quad d = \frac{1}{2}gcd(14 + 10, 11 - 5) = 3,$$

$$p_i = 1^2 + 4^2 = 17, \quad p_j = 2^2 + 3^2 = 13$$

Proposition 3

Let θ be a Type-2 semi-prime, then the following statements are true:

(i) There exist positive integers m<n with even m and odd n such that $$\theta = n^2 - m^2 = (n + m)(n - m) = q_i \times q_j.$$

For instance, given θ=77=7×11, there is m=2<n=9, and $q_i$=9+2=11, $q_j$=9−2=7.

Proposition 4

Let θ be a Type-3 semi-prime, then the following statements are true:

(i) There exist positive integers m>n with even m and odd n such that $$\theta = m^2 - n^2 = (m + n)(m - n) = p_i \times q_j.$$

For instance, given θ=143=13×11, there is m=12, n=1, and $p_i$=12+1=13, $q_j$=12−1=11.

Let $\theta > 0$ be a semi-prime with $\lambda > 0$, a positive even number, such that $$\theta = \sum_{i=0}^{\lambda} a_i \times 10^i, \ a_i \in \{0, 1, \ldots, 9\} \text{ for } i = 0,$$

$$\ldots, \lambda - 1 \text{ and } a_\lambda \in \{1, \ldots, 99\}.$$

Proposition 5-1

If $\theta$ is Type-1 semi-prime, then 0 can be expressed as:

$$\theta = m^2 + n^2 = \left( \sum_{j=0}^{\lambda/2} x_j \times 10^j \right)^2 + \left( \sum_{j=0}^{\lambda/2} y_j \times 10^j \right)^2$$

$$= \left( x_0^2 + y_0^2 \right) \times 10^0$$

$$+ 2(x_0 x_1 + y_0 y_1) \times 10^1$$

$$+ \left[ x_1^2 + y_1^2 + 2(x_0 x_2 + y_0 y_2) \right] \times 10^2$$

$$+ 2(x_0 x_3 + y_0 y_3 + x_1 x_2 + y_1 y_2) \times 10^3$$

$$+ \left[ x_2^2 + y_2^2 + 2(x_0 x_4 + y_0 y_4 + x_1 x_3 + y_1 y_3) \right] \times 10^4$$

$$+ 2(x_0 x_5 + y_0 y_5 + x_1 x_4 + y_1 y_4 + x_2 x_3 + y_2 y_3) \times 10^5$$

$$+ \cdots$$

$$+ \left[ x_{\frac{(\lambda-4)}{2}}^2 + y_{\frac{(\lambda-4)}{2}}^2 + 2\left( x_{\frac{\lambda}{2}-4} x_{\frac{\lambda}{2}} + y_{\frac{\lambda}{2}-4} y_{\frac{\lambda}{2}} + x_{\frac{\lambda}{2}-3} x_{\frac{\lambda}{2}-1} + y_{\frac{\lambda}{2}-3} y_{\frac{\lambda}{2}-1} \right) \right] \times 10^{\lambda-4}$$

$$+ 2\left( x_{\frac{\lambda}{2}-3} x_{\frac{\lambda}{2}} + y_{\frac{\lambda}{2}-3} y_{\frac{\lambda}{2}} + x_{\frac{\lambda}{2}-2} x_{\frac{\lambda}{2}-1} + y_{\frac{\lambda}{2}-2} y_{\frac{\lambda}{2}-1} \right) \times 10^{\lambda-3}$$

$$+ \left[ x_{\frac{(\lambda-2)}{2}}^2 + y_{\frac{(\lambda-2)}{2}}^2 + 2\left( x_{\frac{\lambda}{2}-2} x_{\frac{\lambda}{2}} + y_{\frac{\lambda}{2}-2} y_{\frac{\lambda}{2}} \right) \right] \times 10^{\lambda-2}$$

$$+ 2\left( x_{\frac{\lambda}{2}-1} x_{\frac{\lambda}{2}} + y_{\frac{\lambda}{2}-1} y_{\frac{\lambda}{2}} \right) \times 10^{\lambda-1}$$

$$+ \left( x_{\frac{\lambda}{2}}^2 + y_{\frac{\lambda}{2}}^2 \right) \times 10^\lambda$$

where
(i) $x_0$ is even, $y_0$ is odd,
(ii) $x_0, x_1, \ldots, x_{\lambda/2}, y_0, y_1, \ldots, y_{\lambda/2} \in \{0, 1, \ldots, 9\}$, $$x_0^2 + y_0^2 = a_0 \text{ and } x_{\lambda/2}^2 + y_{\lambda/2}^2 \le a_\lambda. \quad \text{(iii)}$$

Let $\theta > 0$ be a semi-prime with $\lambda > 0$, a positive even number, such that $$\theta = \sum_{i=0}^{\lambda} a_i \times 10^i, \ a_i \in \{0, 1, \ldots, 9\} \text{ for } i = 0,$$

$$\ldots, \lambda - 1 \text{ and } a_\lambda \in \{1, \ldots, 99\}.$$

Proposition 5-2

If $\theta$ is Type-2 semi-prime, then 0 can be expressed as $$\theta = -m^2 + n^2 = -\left( \sum_{j=0}^{\lambda/2} x_j \times 10^j \right)^2 + \left( \sum_{j=0}^{\lambda/2} y_j \times 10^j \right)^2$$

$$= \left( -x_0^2 + y_0^2 \right) \times 10^0$$

$$+ 2(-x_0 x_1 + y_0 y_1) \times 10^1$$

$$+ \left[ -x_1^2 + y_1^2 + 2(-x_0 x_2 + y_0 y_2) \right] \times 10^2$$

-continued $$+ 2(-x_0 x_3 + y_0 y_3 - x_1 x_2 + y_1 y_2) \times 10^3$$

$$+ \left[ -x_2^2 + y_2^2 + 2(-x_0 x_4 + y_0 y_4 - x_1 x_3 + y_1 y_3) \right] \times 10^4$$

$$+ 2(-x_0 x_5 + y_0 y_5 - x_1 x_4 + y_1 y_4 - x_2 x_3 + y_2 y_3) \times 10^5$$

$$+ \cdots$$

$$+ \left[ -x_{\frac{(\lambda-4)}{2}}^2 + y_{\frac{(\lambda-4)}{2}}^2 + \right.$$

$$\left. 2\left( -x_{\frac{\lambda}{2}-4} x_{\frac{\lambda}{2}} + y_{\frac{\lambda}{2}-4} y_{\frac{\lambda}{2}} - x_{\frac{\lambda}{2}-3} x_{\frac{\lambda}{2}-1} + y_{\frac{\lambda}{2}-3} y_{\frac{\lambda}{2}-1} \right) \right] \times 10^{\lambda-4}$$

$$+ 2\left( -x_{\frac{\lambda}{2}-3} x_{\frac{\lambda}{2}} + y_{\frac{\lambda}{2}-3} y_{\frac{\lambda}{2}} - x_{\frac{\lambda}{2}-2} x_{\frac{\lambda}{2}-1} + y_{\frac{\lambda}{2}-2} y_{\frac{\lambda}{2}-1} \right) \times 10^{\lambda-3}$$

$$+ \left[ -x_{\frac{(\lambda-2)}{2}}^2 + y_{\frac{(\lambda-2)}{2}}^2 + 2\left( -x_{\frac{\lambda}{2}-2} x_{\frac{\lambda}{2}} + y_{\frac{\lambda}{2}-2} y_{\frac{\lambda}{2}} \right) \right] \times 10^{\lambda-2}$$

$$+ 2\left( -x_{\frac{\lambda}{2}-1} x_{\frac{\lambda}{2}} + y_{\frac{\lambda}{2}-1} y_{\frac{\lambda}{2}} \right) \times 10^{\lambda-1}$$

$$+ \left( -x_{\frac{\lambda}{2}}^2 + y_{\frac{\lambda}{2}}^2 \right) \times 10^\lambda$$

where
(i) $x_0$ is even, $y_0$ is odd, $$x_0, x_1, \cdots, x_{\frac{\lambda}{2}}, y_0, y_1, \cdots, y_{\frac{\lambda}{2}} \in \{0, 1, \ldots, 9\}, \quad \text{(ii)}$$

$$-x_0^2 + y_0^2 = a_0 \text{ and } -x_{\frac{\lambda}{2}}^2 + y_{\frac{\lambda}{2}}^2 \le a_\lambda. \quad \text{(iii)}$$

Let $\theta > 0$ a semi-prime with $\lambda > 0$ being a positive even number such that $$\theta = \sum_{i=0}^{\lambda} a_i \times 10^i, \ a_i \in \{0, 1, \ldots, 9\} \text{ for } i = 0,$$

$$\ldots, \lambda - 1 \text{ and } a_\lambda \in \{1, \ldots, 99\}.$$

Proposition 5-3

If $\theta$ is Type-3 semi-prime, then 0 can be expressed as $$\theta = m^2 - n^2 = \left( \sum_{j=0}^{\lambda/2} x_j \times 10^j \right)^2 - \left( \sum_{j=0}^{\lambda/2} y_j \times 10^j \right)^2$$

$$= \left( x_0^2 - y_0^2 \right) \times 10^0$$

$$+ 2(x_0 x_1 - y_0 y_1) \times 10^1$$

$$+ \left[ x_1^2 - y_1^2 + 2(x_0 x_2 - y_0 y_2) \right] \times 10^2$$

$$+ 2(x_0 x_3 - y_0 y_3 + x_1 x_2 - y_1 y_2) \times 10^3$$

$$+ \left[ x_2^2 - y_2^2 + 2(x_0 x_4 - y_0 y_4 + x_1 x_3 - y_1 y_3) \right] \times 10^4$$

$$+ 2(x_0 x_5 - y_0 y_5 + x_1 x_4 - y_1 y_4 + x_2 x_3 - y_2 y_3) \times 10^5$$

$$+ \cdots$$

$$+ \left[ x_{\frac{(\lambda-4)}{2}}^2 + y_{\frac{(\lambda-4)}{2}}^2 + 2\left( x_{\frac{\lambda}{2}-4} x_{\frac{\lambda}{2}} - y_{\frac{\lambda}{2}-4} y_{\frac{\lambda}{2}} + x_{\frac{\lambda}{2}-3} x_{\frac{\lambda}{2}-1} - y_{\frac{\lambda}{2}-3} y_{\frac{\lambda}{2}-1} \right) \right] \times 10^{\lambda-4}$$

$$+ 2\left( x_{\frac{\lambda}{2}-3} x_{\frac{\lambda}{2}} - y_{\frac{\lambda}{2}-3} y_{\frac{\lambda}{2}} + x_{\frac{\lambda}{2}-2} x_{\frac{\lambda}{2}-1} - y_{\frac{\lambda}{2}-2} y_{\frac{\lambda}{2}-1} \right) \times 10^{\lambda-3}$$

$$+ \left[ x_{\frac{(\lambda-2)}{2}}^2 - y_{\frac{(\lambda-2)}{2}}^2 + 2\left( x_{\frac{\lambda}{2}-2} x_{\frac{\lambda}{2}} - y_{\frac{\lambda}{2}-2} y_{\frac{\lambda}{2}} \right) \right] \times 10^{\lambda-2}$$

$$+ 2\left( x_{\frac{\lambda}{2}-1} x_{\frac{\lambda}{2}} - y_{\frac{\lambda}{2}-1} y_{\frac{\lambda}{2}} \right) \times 10^{\lambda-1}$$

-continued $$+\left(x_{\frac{\lambda}{2}}^2 - y_{\frac{\lambda}{2}}^2\right) \times 10^\lambda$$

where
(i) $x_0$ is even, $y_0$ is odd, $$x_0, x_1, \cdots, x_{\frac{\lambda}{2}}, y_0, y_1, \cdots, y_{\frac{\lambda}{2}} \in \{0, 1, \ldots, 9\}, \qquad \text{(ii)}$$

$$x_0^2 - y_0^2 = a_0 \text{ and } x_{\frac{\lambda}{2}}^2 - y_{\frac{\lambda}{2}}^2 \le a_\lambda. \qquad \text{(iii)}$$

Example 3: A semi-prime $\theta = 12,648,677,849$ (d=11, $\lambda$=d−1=10) can be written as $$\theta = \sum_{i=0}^{10} a_i \times 10^i = 1 \times 10^{10} + 2 \times 10^9 + 6 \times 10^8 + 4 \times 10^7 + 8 \times 10^6 +,$$

$$6 \times 10^5 + 7 \times 10^4 + 7 \times 10^3 + 8 \times 10^2 + 4 \times 10^1 + 9 \times 10^0 \text{ with}$$

$$(a_{10}, a_9, a_8, \cdots, a_0) = (1, 2, 6, 4, 8, 6, 7, 7, 8, 4, 9).$$

Since $\theta = 4k+1$ type, it can be expressed as $$\theta = m^2 + n^2 = \left(\sum_{j=0}^5 x_j \times 10^j\right)^2 + \left(\sum_{j=0}^5 y_j \times 10^j\right)^2 \ (m \text{ is even}, n \text{ is odd})$$

$$= (x_0^2 + y_0^2) \times 10^0$$

$$+ 2(x_0 x_1 + y_0 y_1) \times 10^1$$

$$+ \left[x_1^2 + y_1^2 + 2(x_0 x_2 + y_0 y_2)\right] \times 10^2$$

$$+ 2(x_0 x_3 + y_0 y_3 + x_1 x_2 + y_1 y_2) \times 10^3$$

$$+ \left[x_2^2 + y_2^2 + 2(x_0 x_4 + y_0 y_4 + x_1 x_3 + y_1 y_3)\right] \times 10^4$$

$$+ 2(x_0 x_5 + y_0 y_5 + x_1 x_4 + y_1 y_4 + x_2 x_3 + y_2 y_3) \times 10^5$$

$$+ \left[x_3^2 + y_3^2 + 2(x_1 x_5 + y_1 y_5 + x_2 x_4 + y_2 y_4)\right] \times 10^6$$

$$+ 2(x_2 x_5 + y_2 y_5 + x_3 x_4 + y_3 y_4) \times 10^7$$

$$+ \left[x_4^2 + y_4^2 + 2(x_3 x_5 + y_3 y_5)\right] \times 10^8$$

$$+ 2(x_4 x_5 + y_4 y_5) \times 10^9$$

$$+ (x_5^2 + y_5^2) \times 10^{10}$$

Remark 3-1

Let $\theta$ be a Type-1 semi-prime. Denote $A_j$ as the polynomial function associate with the term of $10^j$ in the expression of $\theta$ for j=0, . . . , $\lambda$. Then, there are:
(i) If j=0, then $A_0 = x_0^2 + y_0^2$.
(ii) If $0 < j < \theta$ is odd, then $A_j = 2\Sigma_{(h,l) \in S_j}(x_h x_l + y_h y_l)$, where $S_j = \{(h,l) \text{ integers}: h+l=j, 0 \le h < l \le \lambda/2\}$.
(iii) If $0 < j < \lambda$ is even, then $A_j = x_{j/2}^2 + y_{j/2}^2 + 2\Sigma_{(h,l) \in S_j}(x_h x_l + y_h y_l)$.
(iv) If j=$\lambda$, then $A_\lambda = x_{\lambda/2}^2 + y_{\lambda/2}^2$.
Proposition 6-1

For $\theta$ and $A_j$ in Remark 3-1, it is true that $$\theta = A_0 \times 10^0 + A_1 \times 10^1 + \ldots + A_\lambda \times 10^\lambda = \sum_{j=0}^\lambda A_j \times 10^j.$$

Remark 3-2

Let $\theta$ be a Type-2 semi-prime. Denote $B_j$ as the polynomial function associate with the term of $10^j$ in the expression of $\theta$ for j=0, . . . , $\lambda$. Then, it is obtained as follows:

(i) If j=0, then $B_0 = -x_0^2 + y_0^2$.
(ii) If $0 < j < \lambda$ is odd, then $B_j = 2\Sigma_{(h,l) \in S_j}(-x_h x_l + y_h y_l)$, where $S_j = \{(h,l) \text{ integers}: h+l=j, 0 \le h < l \le \lambda/2\}$.
(iii) If $0 < j < \lambda$ is even, then $B_j = x_{j/2}^2 + y_{j/2}^2 + 2\Sigma_{(h,l) \in S_j}(-x_h x_l + y_h y_l)$.
(iv) If j=1, then $B_\lambda = -x_{\lambda/2}^2 + y_\lambda^2$.
Proposition 6-2

For $\theta$ and $B_j$ in Remark 3-2, it is true that $$\theta = B_0 \times 10^0 + B_1 \times 10^1 + \ldots + B_\lambda \times 10^\lambda = \sum_{j=0}^\lambda B_j \times 10^j.$$

Remark 3-3

Let $\theta$ be a Type-3 semi-prime. Denote $C_j$ as the polynomial function associate with the term of $10^j$ in the expression of $\theta$ for j=0, . . . , $\lambda$. Then there are:
(i) If j=0, then $C_0 = x_0^2 - y_0^2$.
(ii) If $0 < j < \lambda$ is odd, then $C_j = 2\Sigma_{(h,l) \in S_j}(x_h x_l - y_h y_l)$, where $S_j = \{(h,l) \text{ integers}: h+l=j, 0 < h < l \le \lambda/2\}$.
(iii) If $0 < j < \lambda$ is even, then $C_j = x_{j/2}^2 + y_{j/2}^2 + 2\Sigma_{(h,l) \in S_j}(x_h x_l - y_h y_l)$.
(iv) If j=2, then $C_\lambda = x_{\lambda/2}^2 - y_{\lambda/2}^2$.
Proposition 6-3

For $\theta$ and $C_j$ in Remark 3-3, it is true that $$\theta = C_0 \times 10^0 + C_1 \times 10^1 + \ldots + C_\lambda \times 10^\lambda = \sum_{j=0}^\lambda C_j \times 10^j.$$

Remark 4-1

Notice that $a_j$ represents the digital value and $A_j$ represents a polynomial function for j=0, . . . , $\lambda$, they are closely related in the following way:
Proposition 7-1

For $A_j$ specified in Remark 3-1, there exist $w_0$, . . . , $w_\lambda \in \{0, 1, \ldots, 16\}$ such that the following equations are true:

$$A_0 = x_0^2 + y_0^2 = 10 w_0 + a_0 \qquad \text{(i)}$$

$$A_j = 10 w_j + a_j - w_{j-1}, \ j = 1, \ldots, \lambda - 1 \qquad \text{(ii)}$$

where $A_j = 2\Sigma_{(h,l) \in S_j}(x_h x_l + y_h y_l)$, when j is odd; $A_j = x_{j/2}^2 + y_{j/2}^2 + 2\Sigma_{(h,l) \in S_j}(x_h x_l + y_h y_l)$, when j is even; and $S_j = \{(h,l) \text{ integers}: h+l=j, 0 \le h < l \le \lambda/2\}$.

$$A_\lambda = x_{\lambda/2}^2 + y_{\lambda/2}^2 + = 10 w_\lambda + a_\lambda - w_{\lambda-1} \qquad \text{(iii)}$$

Example 4: For a $$\theta = \sum_{j=0}^{10} a_j \times 10^\lambda = (x_5 \times 10^5 + x_4 \times 10^4 + \ldots + x_0)^2 +$$

$$(y_5 \times 10^5 + y_4 \times 10^4 + \ldots + y_0)^2 = \sum_{j=1}^{10} A_j \times 10^\lambda.$$

between $A_j$ and $a_j$ can be expressed by equations below:

$$A_0 = x_0^2 + y_0^2 = 10 w_0 + a_0,$$

-continued $$A_1 = 2(x_0x_1 + y_0y_1) = 10w_1 + a_1 - w_0,$$

$$A_2 = 2(x_0x_2 + y_0y_2) + x_1^2 + y_1^2 = 10w_2 + a_2 - w_1,$$

$$A_3 = 2(x_0x_3 + y_0y_3 + x_1x_2 + y_1y_2) = 10w_3 + a_3 - w_2,$$

$$A_4 = 2(x_0x_4 + y_0y_4 + x_1x_3 + y_1y_3) + x_2^2 + y_2^2 = 10w_4 + a_4 - w_3,$$

$$A_5 = 2(x_0x_5 + y_0y_5 + x_1x_4 + y_1y_4 + x_2x_3 + y_2y_3) = 10w_5 + a_5 - w_4,$$

$$A_6 = 2(x_2x_4 + y_2y_4) + x_3^2 + y_3^2 = 10w_6 + a_6 - w_5,$$

$$A_7 = 2(x_2x_5 + y_2y_5 + x_3x_4 + y_3y_4) = 10w_7 + a_7 - w_6,$$

$$A_8 = 2(x_3x_5 + y_3y_5) + x_4^2 + y_4^2 = 10w_8 + a_8 - w_7,$$

$$A_9 = 2(x_4x_5 + y_4y_5) = 10w_9 + a_9 - w_8,$$

$$A_{10} = x_5^2 + y_5^2 = 10w_{10} + a_{10} - w_9,$$

for some $w_0, \ldots, w_{10} \in \{0, 1, \ldots, 16\}$.

Remark 4-2

Notice that $a_j$ represents the digital value and $B_j$ represents a polynomial function for $j = 0, \ldots, \lambda$, they are closely related in the following way:

Proposition 7-2

For $B_j$ specified in Remark 3-2, there exist $w_0, \ldots, w_\lambda \in \{0, 1, \ldots, 16\}$ such that the following equations are true:

$$B_0 = -x_0^2 + y_0^2 = 10w_0 + a_0 \qquad (i)$$

$$B_j = 10w_j + a_j - w_{j-1}, \; j = 1, \ldots, \lambda - 1 \qquad (ii)$$

where $B_j = 2\Sigma_{(h,l) \in S_j}(-x_h x_l + y_h y_l)$, when j is odd;
$B_j = -x_{j/2}^2 + y_{j/2}^2 + 2\Sigma_{(h,l) \in S_j}(-x_h x_l + y_h y_l)$, when j is even;
and $S_j = \{(h,l) \text{ integers}: h+l=j, \; 0 \leq h < l \leq \lambda/2\}$.

$$B_\lambda = -x_{\lambda/2}^2 + y_{\lambda/2}^2 = 10w_\lambda + a_\lambda - w_{\lambda-1}. \qquad (iii)$$

Remark 4-3

Notice that $a_j$ represents the digital value and $C_j$ represents a polynomial function for $j = 0, \ldots, \lambda$, they are closely related in the following way:

Proposition 7-3

For $C_j$ specified in Remark 3-3, there exist $w, \ldots, w_\lambda \in \{0, 1, \ldots, 16\}$ such that the following equations are true:

$$C_0 = x_0^2 + y_0^2 = 10w_0 + a_0, \qquad (i)$$

$$C_j = 10w_j + a_j - w_{j-1}, \; j = 1, \ldots, \lambda - 1, \qquad (ii)$$

where $C_j = 2\Sigma_{(h,l) \in S_j}(x_h x_l - y_h y_l)$, when j is odd;
$C_j = x_{j/2}^2 - y_{j/2}^2 + 2\Sigma_{(h,l) \in S_j}(x_h x_l - y_h y_l)$, when j is even;
and $S_j = \{(h,l) \text{ integers}: h+l=j, \; 0 \leq h < l \leq \lambda/2\}$.

$$C_\lambda = x_{\lambda/2}^2 - y_{\lambda/2}^2 = 10w_\lambda + a_\lambda - w_{\lambda-1}. \qquad (iii)$$

Proposition 8-1:

For $A_j$ specified in Proposition 7-1, given the values of $(x_0, y_0, x_{\lambda/2}, y_{\lambda/2})$, we can solve all $A_j$ equations by linear integer programs effectively as follows:

(i) Given $x_0$ and $y_0$, we obtain $$w_0 = \frac{1}{10}(a_0 - x_0^2 - y_0^2)$$

(ii) Given $x_0$, $y_0$, and $w_0$ found in (i), we obtain the values of $x_1$, $y_1$ and $w_1$ by solving the following linear integer program:

Min. $w_1$ subject to $$2(x_0x_1 + y_0y_1) = 10w_1 + a_1 - w_0;$$

$$x_1 = \sum_{s=0}^{9} s \times u_1^s;$$

$$y_1 = \sum_{s=0}^{9} s \times v_1^s;$$

$$\sum_{s=0}^{9} u_1^s = 1;$$

$$\sum_{s=0}^{9} v_1^s = 1;$$

$$u_1^s, v_1^s \in \{0, 10, 0 \leq w_1 \leq 16, w_1 \in N_0.$$

(iii) Given $w_1$ found in (ii), we obtain the values of $x_2$, $y_2$ and $w_2$ by solving the following linear integer program:

Min. $w_2$ subject to $$2(x_0x_2 + y_0y_2) + x_1^2 + y_1^2 = 10w_2 + a_2 - w_1;$$

$$x_2 = \sum_{s=0}^{9} s \times u_2^s;$$

$$y_2 = \sum_{s=0}^{9} s \times v_2^s;$$

$$\sum_{s=0}^{9} u_2^s = 1;$$

$$\sum_{s=0}^{9} v_2^s = 1;$$

$$x_1^2 \sum_{s=0}^{9} s^2 \times u_2^s;$$

$$y_1^2 = \sum_{s=0}^{9} s^2 \times v_2^s;$$

$$\sum_{s=0}^{9} u_1^s = 1;$$

$$\sum_{s=0}^{9} v_1^s = 1;$$

$$u_2^s, v_2^s \in \{0, 1\}, 0 \leq w_2 \leq 16, w_2 \in N_0.$$

(iv) Similarly, by given the known $w_j$, $x_j$, $y_j$, it can be found that $x_{j+1}$, $y_{j+1}$ and $w_{j+1}$ for $j = 0, 1, 2, 3, \ldots, \lambda$.

Proposition 8-2:

For $B_j$ specified in Proposition 7-2, given the values of $(x_0, y_0, x_{\lambda/2}, y_{\lambda/2})$, all $B_j$ equations can be solved by similar linear integer programs in Proposition 8.1.

Proposition 8-3:

For $C_j$ specified in Proposition 7-3, given the values of $(x_0, y_0, x_{\lambda/2}, y_{\lambda/2})$, we can solve all $C_j$ equations by similar linear integer programs in Proposition 8.1.

Proposition 9-1

For a Type-1 semi-prime $\theta = (m^2 + n^2$ or $\overline{m}^2 + \overline{n}^2$; m, $\overline{m}$ even, n, $\overline{n}$ odd), If $a_0 = 1$, then $(x_0^2, y_0^2) \in \{(0, 1^2), (0, 9^2), (4^2, 5^2), (6^2, 5^2)\}$.    (i)

If $a_0 = 3$, then $(x_0^2, y_0^2) \in \{(2^2, 3^2), (2^2, 7^2), (8^2, 3^2), (8^2, 7^2)\}$.    (ii)

If $a_0 = 7$, then $(x_0^2, y_0^2) \in \{(4^2, 1^2), (4^2, 9^2), (6^2, 1^2), (6^2, 9^2)\}$.    (iii)

If $a_0 = 9$, then $(x_0^2, y_0^2) \in \{(0, 3^2), (0, 7^2), (2^2, 5^2), (8^2, 5^2)\}$.    (iv)

As listed in the second column of Table 1.

Proposition 9-2

For a Type-2 semi-prime $\theta=(n^2-m^2$; n odd, m even,),

If $a_0 = 1$, then $(x_0^2, y_0^2) \in \{(1^2, 0), (9^2, 0), (5^2, 2^2), (15^2, 8^2)\}$.    (i)

If $a_0 = 3$, then $(x_0^2, y_0^2) \in \{(7^2, 4^2), (13^2, 4^2), (7^2, 6^2), (13^2, 6^2)\}$.    (ii)

If $a_0 = 7$, then $(x_0^2, y_0^2) \in \{(9^2, 2^2), (11^2, 2^2), (9^2, 8^2), (11^2, 8^2)\}$.    (iii)

If $a_0 = 9$, then $(x_0^2, y_0^2) \in \{(3^2, 0), (7^2, 0), (5^2, 4^2), (15^2, 6^2)\}$.    (iv)

As listed in the second column of Table 1.

Proposition 9-3

For a Type-3 semi-prime $\theta=(m^2-n^2$; m even, n odd),

If $a_0 = 1$, then $(x_0^2, y_0^2) \in \{(6^2, 5^2), (10^2, 3^2), (10^2, 7^2), (14^2, 5^2)\}$    (i)

If $a_0 = 3$, then $(x_0^2, y_0^2) \in \{(2^2, 1^2), (8^2, 1^2), (12^2, 9^2), (18^2, 9^2)\}$    (ii)

If $a_0 = 7$, then $(x_0^2, y_0^2) \in \{(4^2, 3^2), (6^2, 3^2), (14^2,{}^2), (16^2, 7^2)\}$    (iii)

If $a_0 = 9$, then $(x_0^2, y_0^2) \in \{(8^2, 5^2), (10^1, 1^2), (10^2, 9^2), (12^2, 5^2)\}$    (iv)

As listed in the second column of Table 1.

$$\alpha = \frac{1}{2}gcd(m-\bar{m}, \bar{n}-n); \beta = \frac{1}{2}gcd(m+\bar{m}, \bar{n}+n);$$

$$\bar{\alpha} = \frac{1}{2}gcd(m-\bar{m}, \bar{n}+n); \bar{\beta} = \frac{1}{2}gcd(m+\bar{m}, \bar{n}-n);$$

then $p=\alpha^2+\beta^2$ and $\bar{p}=\bar{\alpha}^2+\bar{\beta}^2$ are 4k+1 primes and $\theta=p\times\bar{p}$.

Example: Given $\theta=221$, we have $\theta=14^2+5^2=10^2+11^2$. Moreover, $\alpha=1$, $\beta=4$, $\bar{\alpha}=2$, $\bar{\beta}=3$, and then $p=1^2+4^2=17$, $\bar{p}=2^2+3^2=13$ are 4k+1 primes, and $\theta=221=17\times13$.

Proposition 10-2

Let $\theta$ be a Type-2 semi-prime, which is the product of two 4k+3 primes. Then there exist positive integers m<n with m being even and n being odd, such that $\theta=-m^2+n^2$. Moreover, if we denote q=n+m and $\bar{q}$=n−m then q and q are 4k+3 primes and $\theta=q\times\bar{q}$.

Proposition 10-3

Let $\theta$ be a Type-3 semi-prime, which is the product of one 4k+1 prime and one 4k+3 prime. Then there exist positive integers m>n with m being even and n being odd, such that $\theta=m^2-n^2$. Moreover, if it is denoted:

p=m+n and q=m−n then p is a 4+1 prime and q is a 4k+3 prime and $\theta=p\times q$.

Next, for different types of the Semi-primes, methods 1, 2, 3 Are demonstrated to show the different ways of proceeding.

Method 1—Factorization of Type-1 Semi-Primes:

Input—Given any Type-i semi-prime $$\theta = \sum\nolimits_{j=0}^{\lambda} a_j \times 10^j$$

where $\lambda$ is even, $0\leq a_j\leq 9$ for $0\leq j\leq\lambda-1$, and $0\leq a_\lambda\leq 99$.

TABLE 1

| | | | | | | |
|---|---|---|---|---|---|---|
| Possible Values of $(x_0, y_0)$ | | | | | | |
| | $\theta = 4k+1 = m^2+n^2$ Even + Odd | | $\theta = 4k+1 = n^2-m^2$ Odd − Even | | $\theta = 4k+3 = m^2-n^2$ Even − Odd | |
| $\alpha_0$ | $x_0^2$ | $y_0^2$ | $x_0^2$ | $y_0^2$ | $x_0^2$ | $y_0^2$ |
| 1 | 0 | 1 | 1 | 0 | $6^2$ | $5^2$ |
| | 0 | $9^2$ | $9^2$ | 0 | $10^2$ | $3^2$ |
| | $4^2$ | $5^2$ | $5^2$ | $2^2$ | $10^2$ | $7^2$ |
| | $6^2$ | $5^2$ | $15^2$ | $8^2$ | $14^2$ | $5^2$ |
| 3 | $2^2$ | $3^2$ | $13^2$ | $4^2$ | $2^2$ | 1 |
| | $2^2$ | $7^2$ | $7^2$ | $4^2$ | $8^2$ | 1 |
| | $8^2$ | $3^2$ | $13^2$ | $6^2$ | $12^2$ | $9^2$ |
| | $8^2$ | $7^2$ | $7^2$ | $6^2$ | $18^2$ | $9^2$ |
| 7 | $4^2$ | 1 | $9^2$ | $2^2$ | $42^2$ | $3^2$ |
| | $4^2$ | $9^2$ | $11^2$ | $2^2$ | $6^2$ | $3^2$ |
| | $6^2$ | 1 | $11^2$ | $8^2$ | $14^2$ | $7^2$ |
| | $6^2$ | $9^2$ | $9^2$ | $8^2$ | $16^2$ | $7^2$ |
| 9 | 0 | $3^2$ | $3^2$ | 0 | $8^2$ | $5^2$ |
| | 0 | $7^2$ | $7^2$ | 0 | $10^2$ | $1^2$ |
| | $2^2$ | $5^2$ | $5^2$ | $4^2$ | $10^2$ | $9^2$ |
| | $8^2$ | $5^2$ | $15^2$ | $6^2$ | $12^2$ | $5^2$ |

Proposition 10-1

Let $\theta$ be a Type-1 semi-prime that is the product of two 4k+1 primes. Then there exist positive integers m, m, n, n with m>m being even and n<n being odd, such that $\theta=m^2+n^2=\bar{m}^2+\bar{n}^2$. Moreover, if it is denoted as:

Output—Two 4k+1 prime numbers $p_1$ and $p_2$ such that $\theta=p_1\times p_2$.

Subproblems corresponding to the combinations of $a_0$ and $a_\lambda$ are generated.

Mixed-Integer Programming (MIP) Modeling:

Variables: for each subproblem $w_0, \ldots, w_\lambda \in \{0, 1, \ldots, 16\}$ $$x_0 \in \{0, 2, 4, 6, 8\}, x_1 \ldots, x_{\lambda/2} \in \{0, \ldots, 9\} \text{ (transitional only)}$$

$$y_0 \in \{1, 3, 5, 7, 9\}, y_1 \ldots, y_{\lambda/2} \in \{0, \ldots, 9\} \text{ (transitional only)}$$

$$u_h^s \in \{0, 1\}, \text{ for } 0 \le h \le \lambda/2, s \in \{0, 1, \ldots, 9\}$$

$$v_h^s \in \{0, 1\}, \text{ for } 0 \le h \le \lambda/2, s \in \{0, 1, \ldots, 9\}$$

$$x_{(h,l)} \ge 0, \text{ for } (h, l) \in S_j, j = 1, \ldots, \lambda - 1$$

$$y_{(h,l)} \ge 0, \text{ for } (h, l) \in S_j, j = 1, \ldots, \lambda - 1$$

Integer Equations for Each Subproblem:

$$A_0 = x_0^2 + y_0^2 = 10w_0 + a_0,$$

$$A_j = 2\sum\nolimits_{(h,l)\in S_j} (x_h x_l + y_h y_l) = 10w_j + a_j - w_{j-1}, 1 \le j \text{ (odd)} \le \lambda - 1$$

$$A_j = x_{j/2}^2 + y_{j/2}^2 + 2\sum\nolimits_{(h,l)\in S_j} (x_h x_l + y_h y_l) =$$

$$10w_j + a_j - w_{j-1}, 1 \le j \text{ (even)} \le \lambda - 1$$

$$A_\lambda = x_{\lambda/2}^2 + y_{\lambda/2}^2 = 10w_\lambda + a_\lambda - w_{\lambda-1},$$

$$x_0 = \sum\nolimits_{s=0,2,4,6,8} s \times u_0^s,$$

$$x_h = \sum\nolimits_{s=0}^{9} s \times u_h^s, \text{ for } 1 \le h \le \lambda/2,$$

$$x_h^2 = \sum\nolimits_{s=0}^{9} s^2 \times u_h^s, \text{ for } 0 \le h \le \lambda/2,$$

$$\sum\nolimits_{s=0}^{9} u_h^s = 1,$$

$$y_0 = \sum\nolimits_{s=1,3,5,7,9} s \times v_0^s,$$

$$y_h = \sum\nolimits_{s=0}^{9} s \times v_h^s, \text{ for } 1 \le h \le \lambda/2,$$

$$y_h^2 = \sum\nolimits_{s=0}^{9} s^2 \times v_h^s, \text{ for } 0 \le h \le \lambda/2,$$

$$\sum\nolimits_{s=0}^{9} v_h^s = 1.$$

MIP Resolution: Solve the MIP model for each subproblem by an incremental approach in Proposition 8.1.

Optimization:

Step 1: Solve all subproblems to obtain two feasible solutions $(x_0, x_1, \ldots, x_{\lambda/2}; y_0, y_1, \ldots, y_{\lambda/2})$ and $(\overline{x}_0, \overline{x}_1, \ldots, \overline{x}_{\lambda/2}; \overline{y}_0, \overline{y}_1, \ldots, \overline{y}_{\lambda/2})$.

Step 2: Calculate $$m = \sum\nolimits_{j=0}^{\lambda/2} x_j \times 10^j, n = \sum\nolimits_{j=0}^{\lambda/2} y_j \times 10^j.$$

Step 3: Calculate $$\overline{m} = \sum\nolimits_{j=0}^{\lambda/2} \overline{x}_j \times 10^j, \overline{n} = \sum\nolimits_{j=0}^{\lambda/2} \overline{y}_j \times 10^j.$$

Step 4: Calculate $$\alpha = \frac{1}{2} gcd(m - \overline{m}, \overline{n} - n); \beta = \frac{1}{2} gcd(m + \overline{m}, \overline{n} + n);$$

$$\overline{\alpha} = \frac{1}{2} gcd(m - \overline{m}, \overline{n} + n); \overline{\beta} = \frac{1}{2} gcd(m + \overline{m}, \overline{n} - n);$$

Step 5: Calculate $p_1 = \alpha^2 + \beta^2$ and $p_2 = \overline{\alpha}^2 + \overline{\beta}^2$ Step 6: Output $\theta = p_1 \times p_2$ Method 2—Factorization of Type-2 Semi-Primes Input—Given any Type-2 semi-prime $$\theta = \sum\nolimits_{j=0}^{\lambda} a_j \times 10^j$$

where $\lambda$ is even, $0 \le a_j \le 9$ for $0 \le j \le \lambda - 1$, and $0 \le a_\lambda \le 99$.

Output—Two 4k+3 primes $q_1$ and $q_2$ such that $\theta = q_1 \times q_2$

Subproblems corresponding to the combinations of do and an are generated.

MIP Modeling:

Variables: For each subproblem, $w_0, \ldots, w \in \{0, 1, \ldots, 16\}$, $$x_0 \in \{0, 2, 4, 6, 8\}, x_1, \ldots, x_{\lambda/2} \in \{0, \ldots, 9\} \text{ (transitional only)},$$

$$y_0 \in \{1, 3, 5, 7, 9\}, y_1, \ldots, y_{\lambda/2} \in \{0, \ldots, 9\} \text{ (transitional only)},$$

$$u_h^s \in \{0, 1\}, \text{ for } 0 \le h \le \lambda/2, s \in \{0, 1, \ldots, 9\},$$

$$v_h^s \in \{0, 1\}, \text{ for } 0 \le h \le \lambda/2, s \in \{0, 1, \ldots, 9\},$$

$$x_{(h,l)} \ge 0, \text{ for } (h, l) \in S_j, j = 1, \ldots, \lambda - 1,$$

$$y_{(h,l)} \ge 0, \text{ for } (h, l) \in S_j, j = 1, \ldots, \lambda - 1.$$

Integer Equations for Each Subproblem:

$$B_0 = -x_0^2 + y_0^2 = 10w_0 + a_0,$$

$$B_j = 2\sum\nolimits_{(h,l)\in S_j} (-x_h x_l + y_h y_l) = 10w_j + a_j - w_{j-1}, 1 \le j \text{(odd)} \le \lambda - 1.$$

$$B_j = -x_{j/2}^2 + y_{j/2}^2 + 2\sum\nolimits_{(h,l)\in S_j} (-x_h x_l + y_h y_l) = 10w_j + a_j - w_{j-1},$$

$$1 \le j \text{(even)} \le \lambda - 1,$$

$$B_\lambda = x_{\lambda/2}^2 + y_{\lambda/2}^2 = 10w_\lambda + a_\lambda - w_{\lambda-1},$$

$$x_0 = \sum\nolimits_{s=0,2,4,6,8} s \times u_0^s,$$

$$x_h = \sum\nolimits_{s=0}^{9} s \times u_0^s, \text{ for } 1 \le h \le \lambda/2,$$

$$x_h^2 = \sum\nolimits_{s=0}^{9} s^2 \times u_0^s, \text{ for } 0 \le h \le \lambda/2,$$

$$\sum\nolimits_{s=0}^{9} u_0^s = 1,$$

$$y_0 = \sum\nolimits_{s=1,3,5,7,9} s \times v_0^s,$$

$$y_h = \sum\nolimits_{s=0}^{9} s \times v_h^s, \text{ for } 1 \le h \le \lambda/2,$$

$$y_h^2 = \sum\nolimits_{s=0}^{9} s^2 \times v_h^s, \text{ for } 0 \le h \le \lambda/2,$$

$$\sum\nolimits_{s=0}^{9} v_h^s = 1.$$

Optimization Model:

MILP Resolution: Solve the MIP for each subproblem by an incremental technique in Proposition 8.2.

Optimization:

Step 1: Solve all subproblems to get a solution $x_0, x_1, \ldots, x_{\lambda/2}$ and $y_0, y_1, \ldots, y_{\lambda/2}$.

Step 2: Calculate $$m = \sum\nolimits_{j=0}^{\lambda/2} x_j \times 10^j, n = \sum\nolimits_{j=0}^{\lambda/2} y_j \times 10^j.$$

Step 3: Calculate $q_1=n+m$ and $q_2=n-m$.

Step 4: Output $\theta=q_1 \times q_2$.

Method 3—Factorization of Type-3 Semi-Primes

Input—Given any Type-3 semi-prime $$\theta = \sum_{j=0}^{\lambda} a_j \times 10^j$$

where $\lambda$ is even, $0 \le a_j \le 9$ for $0 < j \le \lambda-1$, and $0 \le a_\lambda \le 99$.

Output—One $4k+1$ and one $4k+3$ prime numbers $p_1$ and $q_2$ such that $\theta=p_1 \times q_2$.

Subproblems corresponding to the combinations of do and an are generated.

MIP Modeling:

Variables: For each subproblem, $w_0, \ldots, w_2 \in \{0, 1, \ldots, 16\}$ $$x_0 \in \{0, 2, 4, 6, 8\}, x_1, , x_{\lambda/2} \in \{0, \ldots, 9\} \text{ (transitional only)},$$
$$y_0 \in \{1, 3, 5, 7, 9\}, y_1, , y_{\lambda/2} \in \{0, \ldots, 9\} \text{ (transitional only)},$$
$$u_h^s \in \{0, 1\}, \text{ for } 0 \le h \le \lambda/2, s \in \{0, 1, \ldots, 9\},$$
$$v_h^s \in \{0, 1\}, \text{ for } 0 \le h \le \lambda/2, s \in \{0, 1, \ldots, 9\},$$
$$x_{(h,l)} \ge 0, \text{ for } (h, l) \in S_j, j = 1, \ldots, \lambda-1,$$
$$y_{(h,l)} \ge 0, \text{ for } (h, l) \in S_j, j = 1, \ldots, \lambda-1.$$

Integer Equations for Each Subproblem:

$$C_0 = x_0^2 - y_0^2 = 10w_0 + a_0$$
$$C_j = 2\sum_{(h,l) \in S_j}(x_h x_l - y_h y_l) = 10w_j + a_j - w_{j-1}, 1 \le j(\text{odd}) \le \lambda-1.$$
$$C_j = -x_{j/2}^2 - y_{j/2}^2 + 2\sum_{(h,l) \in S_j}(x_h x_l - y_h y_l) = 10w_j + a_j - w_{j-1},$$
$$1 \le j(\text{even}) \le \lambda-1,$$
$$C_\lambda = x_{\lambda/2}^2 - y_{\lambda/2}^2 = 10w_\lambda + a_\lambda - w_{\lambda-1},$$
$$x_0 = \sum_{s=0,2,4,6,8} s \times u_0^s,$$
$$x_h = \sum_{s=0}^{9} s \times u_h^s, \text{ for } 1 \le h \le \lambda/2,$$
$$x_h^2 = \sum_{s=0}^{9} s^2 \times u_h^s, \text{ for } 0 \le h \le \lambda/2,$$
$$\sum_{s=0}^{9} u_h^s = 1,$$
$$y_0 = \sum_{s=1,3,5,7,9} s \times v_0^s,$$
$$y_h = \sum_{s=0}^{9} s \times v_h^s, \text{ for } 1 \le h \le \lambda/2,$$
$$y_h^2 = \sum_{s=0}^{9} s^2 \times v_h^s, \text{ for } 0 \le h \le \lambda/2,$$
$$\sum_{s=0}^{9} v_h^s = 1.$$

MILP Resolution: Solve the MIP for each subproblem by an incremental technique in Proposition 8.3.

Optimization:

Step 1: Solve all subproblems to get an optimal solution $x_0, x_1, \ldots, x_{\lambda/2}$ and $y_0, y_1, \ldots, y_{\lambda/2}$.

Step 2: Calculate $$m = \sum_{j=0}^{\lambda/2} x_j \times 10^j, n = \sum_{j=0}^{\lambda/2} y_j \times 10^j.$$

Step 3: Calculate $p_1=m+n$ and $q_2=m-n$.

Step 4: Output $\theta=p_1 \times q_2$.

In the following descriptions, examples are used to illustrate some embodiments of the present invention.

Remark 5: For a Type-i semi-prime $\theta$, denote $T_i(\theta)$ and $H_i(\theta)$ as the tail-and-head sets for $(X, Y)$, specified as $$T_1(\theta) = \{(x_0, y_0)|x_0^2 + y_0^2 = a_0\},$$
$$H_1(\theta) = \{(x_{\lambda/2}, y_{\lambda/2})|x_{\lambda/2}^2 + y_{\lambda/2}^2 \le a_0\},$$
$$T_2(\theta) = \{(x_0, y_0)|x_0^2 - y_0^2 = a_0\},$$
$$H_2(\theta) = \{(x_{\lambda/2}, y_{\lambda/2})|x_{\lambda/2}^2 + y_{\lambda/2}^2 \le a_\lambda\},$$
$$T_3(\theta) = \{(x_0, y_0)|x_0^2 - y_0^2 = a_0\},$$
$$H_3(\theta) = \{(x_{\lambda/2}, y_{\lambda/2})|x_{\lambda/2}^2 - y_{\lambda/2}^2 \le a_\lambda\},$$

where $0 < x_0, y_0 \le 9, 0 \le x_{\lambda/2}, y_{\lambda/2} \le 99, x_0, y_0, x_{\lambda/2}, y_{\lambda/2} \in N_0$.

Figure 2:
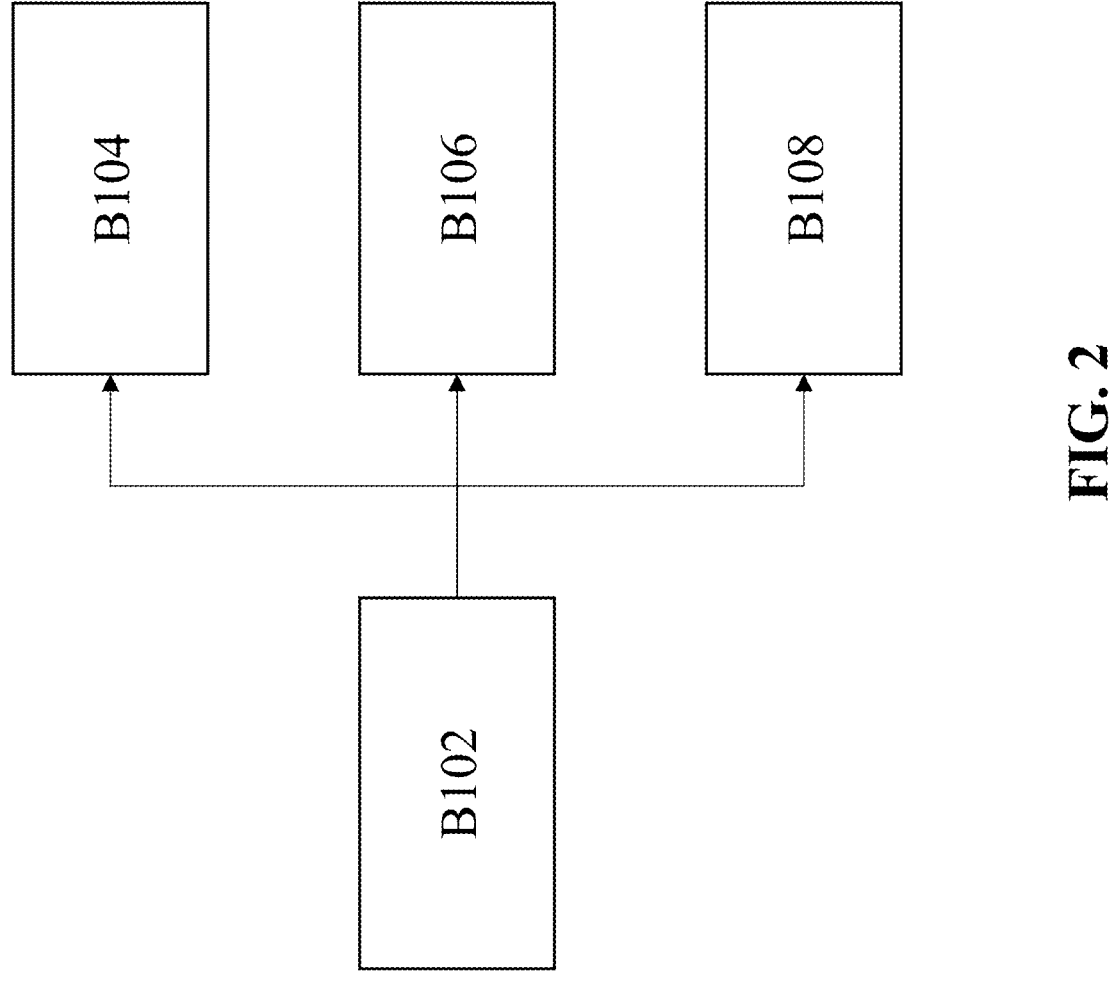
FIG. 2 is a diagram of a Linear-Integer-Programming method for factorizing three types of θ according to an embodiment of the present invention.

A problem of factorizing a Type-i semi-primes $\theta$ can be divided into z subproblems, for $z=|T_i(\theta)| \times |H_i(\theta)|$, where i is 1, 2, or 3. The algorithm for factorizing $$\theta = \sum_{j=0}^{\lambda} 10^\lambda a_j$$

as a product of two primes is illustrated in FIG. 2.

In FIG. 2, diagram of LIP algorithms for Type-i semi-prime $\theta$ is shown, from the block B102, there are three processes, including Type-1 Semi-primes at the block B104, Type-2 Semi-primes at the block B106, and Type-3 Semi-primes at the block B108. The block B102 represents $$\theta = \sum_{j=0}^{\lambda} a_j \times 10^\lambda,$$

which is the first stage for the factorization.

The block B104, representing the Type-1 Semi-primes, contains:

Tail & Head: $T_1$, $H_1$.

Equations: $A_0, A_1, \ldots, A_{\lambda/2}$.

Subproblems: $SP_1, SP_2, \ldots, SP_z, z=|T_1| \times |H_1|$.

Feasible solutions: $(X, Y), (\overline{X}, \overline{Y})$.

$$\theta = \Sigma A_j(X, Y) \times 10^j = \Sigma A_j(\overline{X}, \overline{Y}) \times 10^j.$$
$$\theta = p \times p = (\alpha^2 + \beta^2)(\overline{\alpha}^2 + \overline{\beta}^2).$$
$$\alpha = \frac{1}{2}gcd(m - \overline{m}, \overline{n} - n), \beta = \frac{1}{2}gcd(m + \overline{m}, \overline{n} + n).$$
$$\alpha = gcd(m - \overline{m}, \overline{n} + n), \beta = gcd(m + \overline{m}, \overline{n} - n).$$
$$m = \sum x_j \times 10^j > \overline{m} = \sum \overline{x}_j \times 10^j, n = \sum y_j \times 10^j < \overline{n} = \sum \overline{y}_j \times 10^j.$$
$$A_0 = x_0^2 + y_0^2 = 10\omega_0 + a_0$$

-continued $$A_j = x_{j/2}{}^2 + y_{j/2}{}^2 + 2\sum\nolimits_{h+l=j} (r_{h,l} + z_{h,l}) \quad = 10w_j + a_j - w_{j-1}, j \text{ is even.}$$

$$A_j = 2\sum\nolimits_{h+l=j} (r_{h,l} + z_{h,l}) \quad = 10w_j + a_j - w_{j-1}, j \text{ is odd.}$$

$$A_\lambda = x_{\lambda/2}{}^2 + y_{\lambda/2}{}^2 \quad = 10w_\lambda + a_\lambda - w_{\lambda-1}$$

The block B106, representing the Type-2 Semi-primes, contains:

Tail & Head: $T_2$, $H_2$.

Equations: $B_0$, $B_1$, . . . , $B_{\lambda/2}$.

Subproblems: $SP_1$, $SP_2$, . . . , $SP_z$, $z = |T_2| \times |H_2|$.

Feasible solutions: (X, Y).

$$\theta = \left(\sum y_j \times 10^j\right)^2 - \left(\sum x_j \times 10^j\right)^2 \cdot = \left[\Sigma(y_j + x_j) \times 10^j\right]\left[\Sigma(y_j - x_j) \times 10^j\right].$$

$$B_0 = y_0{}^2 - x_0{}^2 \quad = 10w_0 + a_0$$

$$B_j = y_{j/2}{}^2 + x_{j/2}{}^2 + 2\sum (z_{h,l} + r_{h,l}) \quad = 10w_j + a_j - w_{j-1}, j \text{ is even.}$$

$$B_j = 2\sum (z_{h,l} + r_{h,l}) \quad = 10w_j + a_j - w_{j-1}, j \text{ is odd.}$$

$$B_\lambda = y_{\lambda/2}{}^2 + x_{\lambda/2}{}^2 \quad = 10w_\lambda + a_\lambda - w_{\lambda-1}$$

The block B106, representing the Type-3 Semi-primes, contains:

Tail & Head: $T_3$, $H_3$.

Equations: $C_0$, $C_1$, . . . , $C_{\lambda/2}$.

Subproblems: $SP_1$, $SP_2$, . . . , $SP_z$, $z = |T_3| \times |H_3|$.

Feasible solutions: (X, Y).

$$\theta = \left(\sum x_j \times 10^j\right)^2 - \left(\sum y_j \times 10^j\right)^2 \cdot = \left[\Sigma(x_j + y_j) \times 10^j\right]\left[\Sigma(x_j - y_j) \times 10^j\right].$$

$$C_0 = y_0{}^2 - x_0{}^2 \quad = 10w_0 + a_0$$

$$C_j = x_{j/2}{}^2 + y_{j/2}{}^2 + 2\sum (r_{h,l} + z_{h,l}) \quad = 10w_j + a_j - w_{j-1}, j \text{ is even.}$$

$$C_j = 2\sum (r_{h,l} + z_{h,l}) \quad = 10w_j + a_j - w_{j-1}, j \text{ is odd.}$$

$$C_\lambda = x_{\lambda/2}{}^2 + y_{\lambda/2}{}^2 \quad = 10w_\lambda + a_\lambda - w_{\lambda-1}$$

In the above equations, $x_j = \Sigma l u_{j,l}$, $y_j = \Sigma l v_{j,l}$, $r_{h,l} = x_h x_l$, $z_{h,l} = y_h y_l$, $r_{h,l}$, $z_{h,l} \in \{0, 1\}$. Further, the above equations are transformed into linear-integer-programming subproblems to be solved for finding exact solutions.

Example 5: Semi-prime $\theta = 12,648,677,849$ is to be factorized into the product of two primes. Since 0 is in the form of 4k+1, it is either the product of two Type-1 primes or the product of two Type-3 primes. Firstly, we suppose $\theta$ is the former. Since $$\theta = \sum\nolimits_{j=0}^{10} a_j \times 10^j,$$

we have $(a_{10}, a_9, a_8, \dots a_0) = (1, 2, 6, 4, 8, 6, 7, 7, 8, 4, 9)$. The target $\theta$ is then factorized by Method 1 as follows. Since $a_0 = 9$, referring to Table 1, we have $(x_0, y_0) \in \{(0,3), (0,7), (2,5), (8,5)\}$. Since $a_{10} = 1$, then $$x_5^2 + y_5^2 \leq 1,$$

which implies $(x_5, y_5) \in \{(0,0), (0,1), (1,0)\}$. The problem of factorizing $\theta$ into the product of two 4k+1 primes, can be decomposed as $4 \times 3 = 12$ subproblems $SP_1$, $SP_2$, . . . , $SP_{12}$. The admissible $(x_0, y_0, x_5, y_5)$ tuples for these subproblems are listed in Table 2.

TABLE 2

| 12 subproblems defined by $x_0{}^2 + y_0{}^2 = 9$ and $x_5{}^2 + y_5{}^2 \leq 1$. | | | | | | | | | | | | |
|---|---|---|---|---|---|---|---|---|---|---|---|---|
| SP# | 1 | 2 | 3 | 4 | 5 | 6 | 7 | 8 | 9 | 10 | 11 | 12 |
| $x_0$ | 0 | 0 | 0 | 0 | 0 | 0 | 2 | 2 | 2 | 8 | 8 | 8 |
| $y_0$ | 3 | 3 | 3 | 7 | 7 | 7 | 5 | 5 | 5 | 5 | 5 | 5 |
| $x_5$ | 0 | 0 | 1 | 0 | 0 | 1 | 0 | 0 | 1 | 0 | 0 | 1 |
| $y_5$ | 0 | 1 | 0 | 0 | 1 | 0 | 0 | 1 | 0 | 0 | 1 | 0 |

We take $SP_6$ with $(x_0, y_0, x_5, y_5) = (0, 7, 0, 1)$ as an example.

Step 0: Solving $$A_0 = x_0^2 + y_0^2 = 0 + 49 = 10w_0 + 9,$$

we have $w_0 = 4$.

Step 1: Solve

{Min $w_0$, subject to $2(x_0 x_1 + y_0 y_1) = 14y_1 = 10w_1 + 4 - 4$, $0 \leq w_1 \leq 16$, $0 \leq x_1$, $y_1 \leq 9$} to obtain $w_1 = 0$ and $y_1 = 0$.

Solve

{Min $w_1$, subject to $4y_1 = 10w_1$, $w_1 > 0$, $0 \leq y_1 \leq 9$, $0 \leq w_1 \leq 16$} to obtain $w_1 = 7$ and $y_1 = 5$.

Step 2: Given $(w_1 = 0, y_1 = 0)$, solving $$A_2 = 14y_2 + x_1^2 + y_1^2 = 10w_2 + 8 - w_1,$$

we obtain $(x_1, y_2, w_2) \in \{(2, 1, 1), (0, 2, 2), (2, 6, 8), (0, 7, 9)\}$.

Given $(w_1 = 7, y_1 = 5)$, we solve $A_2 = 10w_2 + 8 - w_1$ and obtain $(x_1, y_2, w_2) \in \{(4, 0, 4), (6, 0, 6), (2, 3, 7), (0, 4, 8)\}$.

Step 3: Given $(x_1, y_2, w_2)$, solving $A_3 = 14y_3 + 2x_1 x_2 + 2y_1 y_2 = 10w_3 + 7 - w_2$, we find that there is no feasible solution.

Given $(x_1, y_2, w_2) = (0, 7, 9)$, we solve A3 and obtain $(y_3, w_3) = (7, 10)$.

Step 4: Given $(y_3, w_3) = (7,10)$, solving $$A_4 = 14y_4 + 2x_1 x_3 + 2y_1 y_3 + x_2^2 + y_2^2 = 10w_4 + 7 - w_3,$$

we find $(x_2, y_4, w_4) = (0, 2, 8)$ among the solutions. Use this solution to solve $$A_5 = 14y_5 + 2x_1 x_4 + 2y_1 y_4 + 2x_2 x_3 + y_2 y_3 = 10w_5 + 6 - w_4$$

and find $w_5 = 10$. This solution is further used to solve $$A_6 = 2x_2 x_4 + 2y_2 y_4 + x_3^2 + y_3^2 = 10w_6 + 8 - w_5$$

and we find $(x_3, w_6)=(9,16)$ among the solutions. Further, we solve $$A_7 = 2x_3x_4 + 2y_3y_4 = 10w_7 + 4 - w_6$$

and find $(x_4, w_7)=(0,4)$ among the solutions. Then, we solve $$A_8 = 2x_3 + x_4^2 + y_4^2 = 10w_8 + 6 - w_7.$$

$(y_4, w_8)=(2,2)$ is one of the solutions. Using this solution, we solve $$A_9 = 2x_4 = 10w_9 + 2 - w_8.$$

to find the solution $w_9=0$. The last equation is solved:

$$A_{10} = 1 = 10w_{10} + 1 - w_9.$$

We obtain $w_{10}=0$.

Therefore, we conclude that subproblem SP6 has a feasible solution.

$$(x_1, x_2, x_3, x_4; y_1, y_2, y_3, y_4) = (0, 0, 9, 0, 0, 7, 7, 2).$$

$$(w_0, w_1, w_2, w_3, \ldots, w_{10}) = (4, 0, 9, 10, 8, 10, 16, 4, 2, 0, 0).$$

$$u_{1,0} = u_{2,0} = u_{3,9} = u_{4,0} = 1, v_{1,0} = v_{2,7} = v_{3,7} = v_{4,2} = 1,$$

$$r_{1,1} = r_{1,2} = r_{1,3} = r_{1,4} = r_{2,2} = r_{2,3} = r_{2,4} = 0; r_{3,3} = 81, r_{3,4} = 0, r_{4,4} = 0,$$

$$z_{2,2} = 49, z_{2,3} = 49, z_{2,4} = 14, z_{3,3} = 49, z_{3,4} = 14, z_{4,4} = 4.$$

Therefore we have:

$$\left(10^5 x_5 + 10^4 x_4 + 10^3 x_3 + 10^2 x_3 + 10^2 x_2 + 10 x_1 + x_0\right)^2 +$$

$$\left(10^5 y_5 + 10^4 y_4 + 10^3 y_3 + 10^2 y_2 + 10 y_1 + y_0\right)^2 =$$

$$10900^2 + 27707^2 = 12,648,677,849 = \theta.$$

Step 5: In a similar way, solving all other 11 subproblems shown in Table 2. We then find that SP$_4$ with $(x_0, y_0, x_5, y_5)=(0, 7, 0, 0)$ has a feasible solutions as $(x_5, x_4, x_3, x_2, x_1; y_5, y_4, y_3, y_2, y_1)=(0, 7, 0, 4, 0, 0; 0, 8, 7, 7, 0, 7)$. That implies $70400^2+87707^2=12,648,677,849$.

While all other 10 subproblems have no feasible solution, from the propositions, we have $\theta=10900^2+27707^2=70400^2+87707^2=(300^2+193^2)(100^2+299^2)=127449\times99401$.

Example 6: Consider semi-prime $\theta=1311413$. We express $\theta$ as $\theta=1\times10^6+3\times10^5+1\times10^4+1\times10^3+4\times10^2+1\times10^2+3$, where $(a_6, a_5, a_4, a_3, a_2, a_1, a_0)=(1, 3, 1, 1, 4, 1, 3)$.

Since $\theta=4k+1$, we first assume that $\theta$ is the product of two 4k+1 prime. No feasible solutions are attainable. We then factorize $\theta$ by Proposition 2 in the following equations.

$$A_0 = y_0^2 - x_0^2 = 10w_0 + 3,$$

$$A_1 = 2(y_0y_1 - x_0x_1) = 10w_1 + 1 - w_0,$$

$$A_2 = 2(y_0y_2 - x_0x_2) + y_1^2 - x_1^2 = 10w_2 + 4 - w_1,$$

$$A_3 = 2(y_0y_3 - y_1y_2 - x_0x_3 - x_1x_2) = 10w_3 + 1 - w_2,$$

$$A_4 = 2(y_0y_4 - y_1y_3 - x_0x_4 - x_1x_3) + y_2^2 - x_2^2 = 10w_4 + 1 - w_3,$$

$$A_5 = 2(y_2y_3 - x_2x_3) = 10w_5 + 3 - w_4,$$

$$A_6 = y_3^2 - x_3^2 = 10w_6 + 1 - w_5.$$

Solving there equations by giving $y_0\in\{3, 7\}$ and $x_0\in\{4, 6\}$ referring to column 2 of Table 1. We obtain a solution below.

$$(w_0, w_1, w_2, w_3, w_4, w_5, w_6) = (-1, 0, 1, 0, 1, 0, 0),$$

$$(y_3, y_2, y_1, y_0; x_3, x_2, x_1, x_0) = (1, 1, 7, 3; 0, 2, 5, 4).$$

Therefore, we have $$\theta = 1311413 = (n + m)(n - m) = n^2 - m^2 = (1173)^2 - (254)^2 = 1427\times919.$$

Example 7 Consider $\theta=181,807$. Since $\theta=4k+3$, it is the product of one 4k+1 prime and one 4k+3 prime. $\theta=18\times10^4+1\times10^3+8\times10^2+7$. By Proposition 3, we can rewritten as $$\theta =$$

$$\left(x_3 \times 10^3 + x_2 \times 10^2 + x_1 \times 10 + x_0\right)^2 - \left(y_3 \times 10^3 + y_2 \times 10^2 + y_1 \times 10 + y_0\right)^2.$$

The following linear equations follow.

$$B_0 = x_0^2 - y_0^2 = 10w_0 + 7,$$

$$B_1 = 2(x_0x_1 - y_0y_1) = 10w_1 + 0 - w_0,$$

$$B_2 = 2(x_0x_2 - y_0y_2) + x_1^2 - y_1^2 = 10w_2 + 8 - w_1$$

$$A_3 = 2(x_0x_3 - x_1x_2 - y_0y_3 - y_1y_2) = 10w_3 + 1 - w_2$$

$$A_4 = 2(x_1x_3 - y_1y_3) + x_2^2 - y_2^2 = 10w_4 + 18 - w_3$$

Solving the problem we obtain $(w_0, w_1, w_2, w_3, w_4)=(0, 0, -1, 3, 0)$ and $(x_3, x_2, x_1, x_0; y_3, y_2, y_1, y_0)=(0, 4, 6, 4; 0, 1, 8, 3)$. Therefore, we have $$\theta = 181807 = (m + n)(m - n) = m^2 - n^2 = 464^2 - 183^2 = 647\times128.$$

Example 8: We consider a larger semi-prime $$\theta = 100000\ 49610\ 15119\ 81129 = \sum_{j=0}^{20} a_j 10^j.$$

Since $\theta$ is a 4k+1 semi-prime, we first assume that it is the product of two Type-1 primes. Following Proposition 8.1 1 and Table 1 (column 1), we have $\theta=(10^{10}x_{10}+10^9x_9+\ldots+x_0)^2+(10^{10}y_{10}+10^9y_9+\ldots+y_0)^2$, where $(x_0, y_0)\in\{(0,3), (0,7), (2,5), (8,5)\}$, $(x_{10}, y_{10})\in\{(0,0), (0,1), (1,0)\}$, and $(a_{20}, a_{19}, \ldots a_0)=(1, 0, 0, 0, 0, 0, 4, 9, 6, 1, 0 \ 0, 5, 1, 1, 9 \ 8, 1, 1, 2, 9)$.

The factorization problem can be divided into $4\times3=12$ subproblems. Each of three subproblems is formed as an integer program with 20 linear equations and some inequities as listed below:

$$\text{Minimize } w_0 + w_1 + \ldots + w_{20}$$

$$A_0 = x_0{}^2 + y_0{}^2 = 10w + 9,$$

$$A_1 = 2(r_{0,1} + z_{0,1}) = 2 - w_1,$$

$$A_2 = 2(r_{0,2} + z_{0,2}) + r_{1,1} + z_{1,1} = 1 - w_2,$$

$$A_3 = 2(r_{0,3} + z_{0,3} + r_{1,2} + z_{1,2}) = 1 - w_3,$$

$$A_4 = 2(r_{0,4} + z_{0,4} + r_{1,3} + z_{1,3}) + r_{2,2} + z_{2,2} = 8 - w_4,$$

$$A_5 = 2(r_{0,5} + z_{0,5} + r_{1,4} + z_{1,4} + r_{2,3} + z_{2,3}) = 9 - w_5,$$

$$A_6 = 2(r_{0,6} + z_{0,6} + r_{1,5} + z_{1,5} + r_{2,4} + z_{2,4}) + r_{3,3} + z_{3,3} = 1 - w_6,$$

$$A_7 = 2(r_{0,7} + z_{0,7} + \ldots + r_{3,4} + z_{3,4}) + r_{3,3} + z_{3,3} = 1 - w_7,$$

$$A_8 = 2(r_{0,8} + z_{0,8} + \ldots + r_{3,5} + z_{3,5}) + r_{4,4} + z_{4,4} = 5 - w_8,$$

$$A_9 = 2(r_{0,9} + z_{0,9} + \ldots + r_{4,5} + z_{4,5}) = 10w_9 + 0 - w_9,$$

$$A_{10} = 2(r_{0,10} + z_{0,10} + \ldots + r_{4,6} + z_{4,6}) = 10w_{10} + 0 - w_{10},$$

$$A_{11} = 2(r_{1,10} + z_{1,10} + r_{2,9} + z_{2,9} + \ldots + r_{5,6} + z_{5,6}) = 10w_{11} + 1 - w_{11},$$

$$A_{12} =$$

$$2(r_{2,10} + z_{2,10} + r_{3,9} + z_{3,9} + \ldots + r_{5,7} + z_{5,7}) + r_{6,6} + z_{6,6} = 10w_{12} + 6 - w_{12},$$

$$A_{13} = 2(r_{3,10} + z_{3,10} + r_{4,9} + z_{4,9} + \ldots + r_{6,7} + z_{6,7}) = 10w_{13} + 9 - w_{13},$$

$$A_{14} = 2(r_{4,10} + z_{4,10} + r_{5,9} + z_{5,9}) + r_{7,9} + z_{7,9} = 10w_{14} + 4 - w_{14},$$

$$A_{15} = 2(r_{5,10} + z_{5,10} + r_{6,9} + z_{6,9} + r_{7,8} + z_{7,8}) = 10w_{15} + 0 - w_{15},$$

$$A_{16} = 2(r_{6,10} + z_{6,10} + r_{7,9} + z_{7,9}) + r_{8,8} + z_{8,8} = 10w_{16} + 0 - w_{16},$$

$$A_{17} = 2(r_{7,10} + z_{7,10} + r_{8,9} + z_{8,9}) = 10w_{17} + 0 - w_{17},$$

$$A_{18} = 2(r_{8,10} + z_{8,10}) + r_{9,9} + z_{9,9} = 10w_{18} + 0 - w_{18},$$

$$A_{19} = 2(r_{9,10} + z_{9,10}) = 10w_{19} + 0 - w_{19},$$

$$A_{20} = r_{10,10} + z_{10,10} = 10w_{20} + 1 - w_{20},$$

where for all feasible h, l, $$x_h = \sum_{l=1}^{9} l \times u_{h,l}, \ \sum_{l=0}^{9} u_{h,l} = 1; \quad \text{(i)}$$

$$y_h = \sum_{l=1}^{9} l \times v_{h,l}, \ \sum_{l=0}^{9} v_{h,l} = 1; \quad \text{(ii)}$$

$$9(u_{h,l} - 1) + lx_l \le r_{h,l} \le lx_l + 9(1 - u_{h,l}), \ 0 \le r_{h,l} \le 9x_l \quad \text{(iii)}$$

$$9(u_{h,l} - 1) + ly_l \le z_{h,l} \le ly_l + 9(1 - v_{h,l}), \ 0 \le z_{h,l} \le 9y_l \quad \text{(iv)}$$

$$u_{h,l}, v_{h,l} \in \{0, 1\}, \ x_h, y_h, r_{h,l}, z_{h,l} \ge 0.$$

For the subproblem with $(x_0, y_0, x_{10}, y_{10})=(0, 7, 0, 1)$, solving the subproblem by a commercial integer programming software we obtain the following solution:
$(x_{10}, x_9, \ldots x_0)=(0, 0, 0, 0, 6, 6, 0, 0, 0, 0, 0)$,
$(y_{10}, y_9, \ldots y_0)=(1, 0, 0, 0, 0, 0, 2, 2, 6, 2, 7)$
$(w_0, w_1, \ldots w_{20})=(4, 3, 9, 6, 7, 3, 3, 1, 0, 0, 5, 8, 5, 0, 0, 0, 0, 0, 0, 0, 0)$.

It readily implies $\theta=6600000^2+10000022627^2$.

For the subproblem with $(x_0, y_0, x_{10}, y_{10})=(0, 3, 0, 0)$, solving the subproblem we obtain
$(x_{10}, x_9, \ldots x_0)=(0, 0, 0, 0, 3, 0, 8, 0, 0, 0, 0, 0)$,
$(y_{10}, y_9, \ldots y_0)=(0, 9, 9, 9, 9, 9, 7, 7, 3, 7, 3)$,
which together implies $\theta=30800000^2+9999977373^2$.
Therefore, we conclude that $$\theta = \left(10^{10} + 121^2\right)\left(10^{10} + 187^2\right) =$$

$$(1000000 \, 14641) \times (1000000 \, 34969) = 100000 \, 49610 \, 05119 \, 81129.$$

In the case that no feasible solution exists when factorizing $\theta$ by assuming the product of two type-(4k+1) primes. Then, we follow Proposition 8.3 to factorize $\theta$, since it is the product of two type-(4k+3) primes.

Example 9: Consider a large factorization problem marked as RSA-100 which has a decimal value of 100. That is $\theta=1522\ldots139$. LIP method factorizes $\theta$ as follows:

(i) Checking $\theta$ to know it is a 4k+3 semi-primes, therefore $\theta$ is the product of. one 4k+1 prime and one 4k+3 prime. We then denote $\theta$ as below by Proposition 8.3:

$$\theta = m^2 - n^2 = \left(x_{50}10^{50} + x_{49}10^{49} + \ldots + 10x_1 + x_0\right)^2 =$$

$$\left(y_{50}10^{50} + y_{40}10^{49} + \ldots + 10y_1 + y_0\right)$$

(ii) Since $a_0=9$ and $a_{100}=1$, we have
$(x_0, y_0)\in\{(8,5), (12,5), (10,1), (10,9)\}$,
$(x_{50}, y_{50})\in\{(1,0), (0,0)\}$.

(iii) Solving the binary program by a commercial integer program software to obtain the solution as $$m^2 = \left(x_{50}10^{50} + x_{49}10^{49} + \ldots + x_0\right)^2 =$$

$$(3903496444 \ 3937277976 \ 7463040241 \ 0354812189 \ 0218231130),$$

$$n^2 = \left(x_{50}10^{50} + x_{49}10^{49} + \ldots + y_0\right)^2 =$$

$$(0095993650 \ 6983604053 \ 9374312686 \ 5792026732 \ 4681492931),$$

(iv) LIP then factorize $\theta$ as $$\theta = \left(\sum_{j=0}^{50} x_j 10^j + \sum_{j=0}^{50} y_j 10^j\right) \times \left(\sum_{j=0}^{50} x_j 10^j - \sum_{j=0}^{50} y_j 10^j\right) = (m + n)(m - n) =$$

$$(4009469095 \ 0920881030 \ 6837352927 \ 6146838921 \ 4899724061) \times$$

$$(3797522793 \ 6943673922 \ 8088727554 \ 4562785456 \ 5536638199)$$

The factorization result is exactly the solution.

Figure 3:
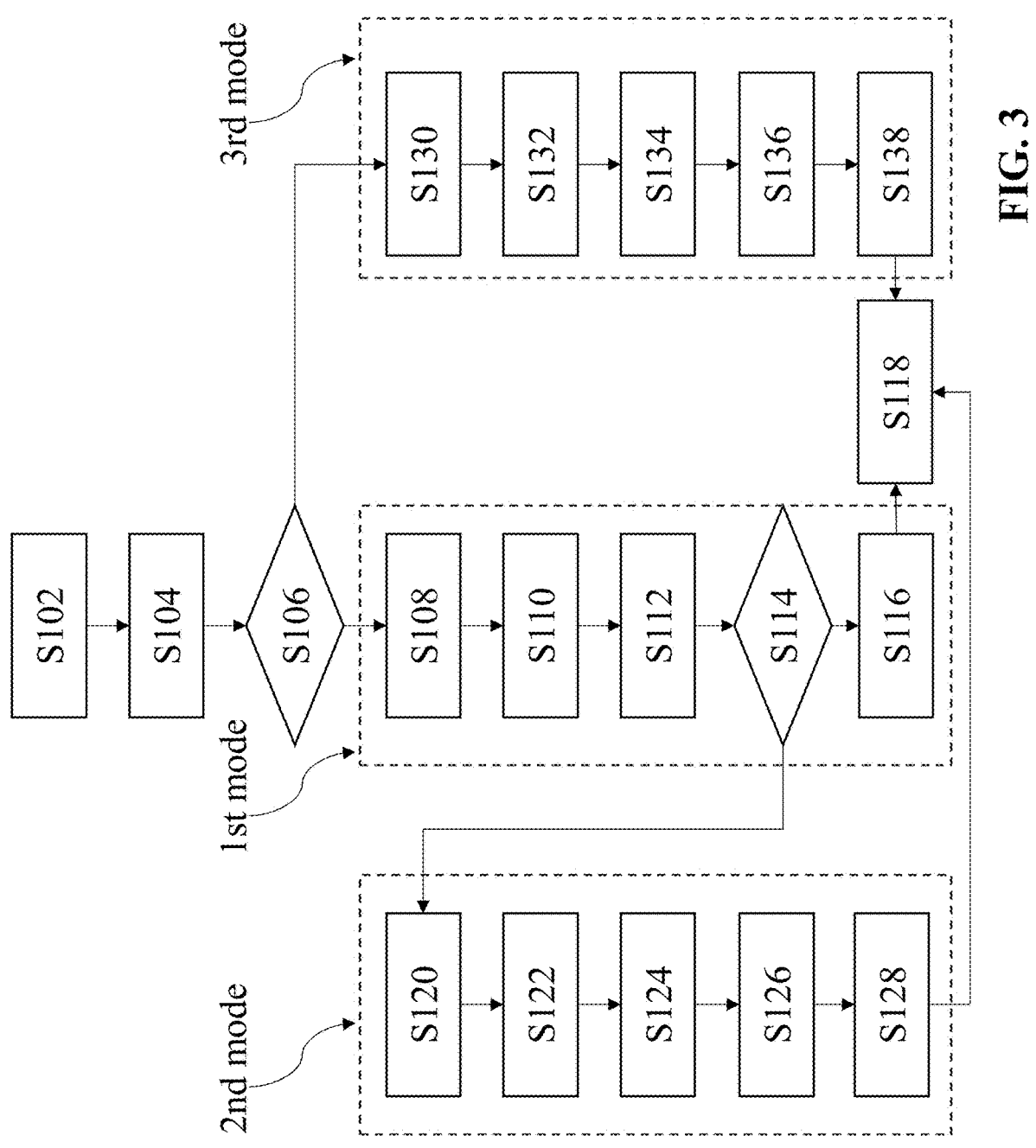
FIG. 3 is a block flowchart of a method for RSA factorization performed by a system according to an embodiment of the present invention.

According to the above, the system 100 can a method for reducing computer processing time during private key decryption during digital communication, which is via performing operations using linear integer programming for RSA factorization as illustration in FIG. 3, including stages S102, S104, S106, S108, S110, S112, S114, S116, S118, S120, S122, S124, S126, S128, S130, S132, S134, S136, and S138.

In stage S102, a semi-prime θ is entered. For example, the semi-prime θ can be extracted by the n/e extractor from the public key and then is fed into the prime factorization calculator.

In stage S104, the semi-prime θ is defined and expressed as $$\theta = \sum_{j=0}^{\lambda} a_j \times 10^j,$$

λ is an even number, $a_j \in \{0, 1, \ldots, 9\}$, $j=0, 1, \ldots, \lambda-1$, $a_\lambda \in \{0, 1, \ldots, 99\}$.

In stage S106, the goal is to determine if semi-prime θ is in the form of a prime number of a type 4k+1 (i.e., is θ a 4k+1 prime?). If it is true, the next stage is S108 for processing in a first mode; otherwise, the next stage is S128 for processing in a third mode.

In stage S108, the semi-prime θ is expressed as:

$$\theta = m^2 + n^2 = \left(\sum_{j=0}^{\lambda/2} x_j \times 10^j\right)^2 + \left(\sum_{j=0}^{\lambda/2} y_j \times 10^j\right)^2,$$

where $x_0$ is even, $y_0$ is odd; (ii) $x_0$, $x_1$, . . . , $x_{\lambda/2}$, $y_0$, $y_1$, . . . , $y_{\lambda/2} \in \{0, 1, \ldots, 9\}$. For example, stage S108 includes:

expressing θ as $\theta = m^2 + n^2$ $$\left( m = \sum_{j=0}^{\frac{\lambda}{2}} x_j \times 10^j \text{ even}, n = \sum_{j=0}^{\frac{\lambda}{2}} y_j \times 10^j \text{ odd}, x_0 \in \{0, 2, 4, 6, 8\}, x_1, \right.$$

$$\left. x_2, \ldots, x_{\frac{\lambda}{2}} \in \{0, 1, , 9\}; y_0 \in \{1, 3, 5, 7, 9\}, y_1, y_2, , y_{\lambda/2} \in \{0, 1, \ldots, 9\}; \right)$$

In stage S110, the main problem is decomposed into subproblems according $$x_0^2 + y_0^2 \equiv a_0 (\text{mod } 10) \text{ and } x_{\lambda/2}^2 + y_{\lambda/2}^2 \le a_\lambda.$$

For example, stage S110 includes decomposing the main problem into subproblems, according to:

$$x_0^2 + y_0^2 \equiv a_0 (\text{mod}10) \text{ and } x_{\lambda/2}^2 + y_{\lambda/2}^2 \le a_\lambda$$

In stages S110 and S112, the prime factorization calculator can start to use a tail digit and a head digit set of the semi-prime number of the modulus to perform decomposition and factorization with respect to the semi-prime number into two prime factors via the first mode. The tail digit represents the last or least significant digit of the semi-prime number, and the head digit set represents the first two or most significant digits of the semi-prime number. For example, stage S112 includes: formulating each subproblem, given the corresponding ($x_0$, $y_0$, $x_{\lambda/2}$, $y_{\lambda/2}$), as an LIP problem as follows:

$$\text{Minimize} \sum_{j=0}^{\lambda-1} w_j$$

$$\text{subject to } A_0 = x_0^2 + y_0^2 = 10w_0 + a_0,$$

$$A_j = \sum_{h+l=j, h, l \in \{0,1, \ldots, \lambda/2\}} (r_{h,l} + z_{h,l}) = 10w_j + a_j - w_{j-1}, 1 \le j \le \lambda - 1,$$

$$A_\lambda = x_{\lambda/2}^2 + y_{\lambda/2}^2 = a_\lambda - w_{\lambda-1},$$

$$w_0, \ldots, w_\lambda \in \mathbb{N},$$

$$x_0 = \sum_{s=0,2,4,6,8} s \times u_0^s, x_h = \sum_{s=0}^{9} s \times u_h^s, h \in \{1,2, \ldots, \lambda/2\},$$

$$\sum_{s=0}^{9} u_h^s = 1, u_h^s \in \{0,1\}, s \in \{0,1, \ldots, 9\}, h \in \{0,1, \ldots, \lambda/2\},$$

$$y_0 = \sum_{s=1,3,5,7,9} s \times v_0^s, y_h = \sum_{s=0}^{9} s \times v_h^s, h \in \{1,2, \ldots, \lambda/2\},$$

$$\sum_{s=0}^{9} v_h^s = 1, v_h^s \in \{0,1\}, s \in \{0,1, \ldots, 9\}, h \in \{0,1, \ldots, \lambda/2\}$$

$$100(u_h^s - 1) + sx_l \le r_{h,l}, 100(1 - u_h^s) +$$

-continued $$sx_l \ge r_{h,l}, r_{h,l} \in \mathbb{N}, h, l \in \{0,1, \ldots, \lambda/2\}, s \in \{0,1, \ldots, 9\}$$

$$100(v_h^s - 1) + sy_l \le z_{h,l}, 100(1 - v_h^s) +$$

$$sy_l \ge z_{h,l}, z_{h,l} \in \mathbb{N}, h, l \in \{0,1, \ldots, \lambda/2\}, s \in \{0,1, \ldots, 9\}$$

In stage S114, the prime factorization calculator can determine if two solutions $$\left( x_0^i, \ldots, x_{\frac{\lambda}{2}}^i, y_0^i, \ldots, y_{\frac{\lambda}{2}}^i \right), i = 1, 2$$

can be solved/obtained from the subproblems as above. If it is true, the next stage is S116 and it is processed via the first mode; otherwise, the next stage is S120 and the processes is switched to a second mode.

In stage S116, the prime factorization calculator can continue to perform factorization with respect to the semi-prime number into two prime factors $p_1$ and $p_2$ via the first mode. For example, stage S116 includes:

$$\text{Calculating } m_i = \sum_{j=0}^{\lambda/2} x_j^i \times 10^j, n_i = \sum_{j=0}^{\lambda/2} y_j^i \times 10^j, i = 1, 2, m_1 > m_2, n_1 < n_2$$

-continued $$\alpha = \frac{1}{2}gcd(m_1 - m_2, n_2 - n_1); \beta = \frac{1}{2}gcd(m_1 + m_2, n_2 + n_1);$$

$$\bar{\alpha} = \frac{1}{2}gcd(m_1 - m_2, n_2 + n_1); \bar{\beta} = \frac{1}{2}gcd(m_1 + m_2, n_2 - n_1);$$

$$p_1 = \alpha^2 + \beta^2, p_2 = \bar{\alpha}^2 + \bar{\beta}^2$$

In stage S118, $p_1$ and $p_2$ are outputted from the prime factorization calculator 120 to the private key determiner 130. Then, it is to determine a private key using the public key exponent and the two prime numbers and then decrypt an encrypted message using the private key, thereby generating a decrypted message.

In stage S120, the semi-prime $\theta$ is expressed as:

$$\theta = n^2 - m^2 = \left(\Sigma_{j=0}^{\frac{\lambda}{2}} y_j \times 10^j\right)^2 - \left(\Sigma_{j=0}^{\lambda/2} x_j \times 10^j\right)^2,$$

where $x_0$ is even, $y_0$ is odd; (ii) $x_0$, $x_1$, . . . , $x_{\lambda/2}$, $y_0$, $y_1$, . . . , $y_{\lambda/2} \in \{0, 1, . . . , 9\}$. For example, stage S120 includes: expressing $\theta$ as $\theta = n^2 - m^2$ $$\left(m = \sum_{j=0}^{\frac{\lambda}{2}} x_j \times 10^j \text{ even}, n = \sum_{j=0}^{\frac{\lambda}{2}} y_j \times 10^j \text{ odd}, x_0 \in \{0,2,4,6,8\}, x_1, x_2, \dots ,\right.$$

$$\left. x_{\frac{\lambda}{2}} \in \{0,1, \dots , 9\}; y_0 \in \{1,3,5,7,9\}, y_1, y_2, \dots , y_{\lambda/2} \in \{0,1, \dots , 9\}\right)$$

In stages S122, S124, S126, and S128, the prime factorization calculator can use a tail digit and a head digit set of the semi-prime number of the modulus to perform decomposition and factorization with respect to the semi-prime number into two prime factors via the second mode. The main problem is decomposed into subproblems according to $$-x_0^2 + y_0^2 \equiv a_0(\text{mod } 10) \text{ and } -x_{\lambda/2}^2 + y_{\lambda/2}^2 \leq a_\lambda.$$

A solution $$\left(x_0, \dots , x_{\frac{\lambda}{2}}, y_0, \dots , y_{\frac{\lambda}{2}}\right)$$

can be obtained from subproblems.

For example, stage S122 includes decomposing the main problem into subproblems, according to:

$$-x_0^2 + y_0^2 \equiv a_0(\text{mod}10) \text{ and } -x_{\lambda/2}^2 + y_{\lambda/2}^2 \leq a_\lambda.$$

For example, stage S124 includes: formulating each subproblem, given the corresponding $(x_0, y_0, x_{\lambda/2}, y_{\lambda/2})$, as an LIP problem as follows:

$$\text{Minimize} \sum_{j=0}^{\lambda-1} w_j$$

-continued subject to $B_0 = -x_0^2 + y_0^2 = 10w_0 + a_0,$ $$B_j = \sum_{h+l=j,h,l\in\{0,1,\dots,\lambda/2\}}(-r_{h,l} + z_{h,l}) = 10w_j + a_j - w_{j-1}, 1 \leq j \leq \lambda - 1,$$

$$B_\lambda = x_{\lambda/2}^2 + y_{\lambda/2}^2 = a_\lambda - w_{\lambda-1},$$

$$w_0, \dots , w_\lambda \in \mathbb{N},$$

$$x_0 = \sum_{s=0,2,4,6,8} s \times u_0^s, x_h = \sum_{s=0}^{9} s \times u_h^s, h \in \{1,2, \dots , \lambda/2\},$$

$$\sum_{s=0}^{9} u_h^s = 1, u_h^s \in \{0,1\}, s \in \{0,1, \dots , 9\}, h \in \{0,1, \dots , \lambda/2\},$$

$$y_0 = \sum_{s=1,3,5,7,9} s \times v_0^s, y_h = \sum_{s=0}^{9} s \times v_h^s, h \in \{1,2, \dots , \lambda/2\},$$

$$\sum_{s=0}^{9} v_h^s = 1, v_h^s \in \{0,1\}, s \in \{0,1, \dots , 9\}, h \in \{0,1, \dots , \lambda/2\}$$

$$100(u_h^s - 1) + sx_l \leq r_{h,l}, 100(1 - u_h^s) +$$

$$sx_l \geq r_{h,l}, r_{h,l} \in \mathbb{N}, h, l \in \{0,1, \dots , \lambda/2\}, s \in \{0,1, \dots , 9\}$$

$$100(v_h^s - 1) + sy_l \leq z_{h,l}, 100(1 - v_h^s) +$$

$$sy_l \geq z_{h,l}, z_{h,l} \in \mathbb{N}, h, l \in \{0,1, \dots , \lambda/2\}, s \in \{0,1, \dots , 9\}$$

For example, stage S126 includes:

obtaining a solution $(x_0, \dots , x_{\lambda/2}; y_0, \dots , y_{\lambda/2})$ from the subproblems.

For example, stage S128 includes:

$$\text{calculating } m = \sum_{j=0}^{\lambda/2} x_j \times 10^j, n = \sum_{j=0}^{\lambda/2} y_j \times 10^j,$$

$$q_1 = n + m, q_2 = n - m$$

Then, it goes to stage S118 for outputting, $q_1$ and $q_2$.

In stage S130, the semi-prime $\theta$ is expressed as:

$$\theta = m^2 - n^2 = \left(\sum_{j=0}^{\lambda/2} x_j \times 10^j\right)^2 - \left(\sum_{j=0}^{\lambda/2} y_j \times 10^j\right)^2,$$

where $x_0$ is even, $y_0$ is odd; (ii) $x_0$, $x_1$, . . . , $x_{\lambda/2}$, $y_0$, $y_1$, . . . , $y_{\lambda/2} \in \{0, 1, . . . , 9\}$. For example, stage S130 includes:

$$\text{expressing } \theta \text{ as } \theta = m^2 - n^2$$

$$\left(m = \sum_{j=0}^{\lambda/2} x_j \times 10^j \text{ even}, n = \sum_{j=0}^{\lambda/2} y_j \times 10^j \text{ odd}, x_0 \in \{0,2,4,6,8\}, x_1, x_2, \dots ,\right.$$

$$\left. x_{\lambda/2} \in \{0,1, \dots , 9\}; y_0 \in \{1,3,5,7,9\}, y_1, y_2, \dots , y_{\lambda/2} \in \{0,1, \dots , 9\}\right)$$

In stage S132, S134, S136, S138, the prime factorization calculator can use a tail digit and a head digit set of the semi-prime number of the modulus to perform decomposition and factorization with respect to the semi-prime number into two prime factors via the third mode. The main problem is decomposed into subproblems according to $$x_0^2 - y_0^2 \equiv a_0 (\text{mod } 0) \text{ and } x_{\lambda/2}^2 - y_{\lambda/2}^2 \le a_\lambda.$$

A solution $$\left( x_0, \ldots, x_{\frac{\lambda}{2}}, y_0, \ldots, y_{\frac{\lambda}{2}} \right)$$

can be obtained from subproblems.

For example, stage S132 includes decomposing the main problem into subproblems, according to:

$$x_0^2 - y_0^2 \equiv a_0 (\text{mod} 10) \text{ and } x_{\lambda/2}^2 - y_{\lambda/2}^2 \le a_\lambda$$

For example, stage S134 includes: formulating each subproblem, given the corresponding $(x_0, y_0, x_{\lambda/2}, y_{\lambda/2})$, as an LIP problem as follows:

$$\text{Minimize } \sum_{j=0}^{\lambda-1} w_j$$

$$\text{subject to } C_0 = x_0^2 - y_0^2 = 10 w_0 + a_0,$$

$$C_j = \sum_{h+l=j, h, l \in \{0,1,\ldots,\lambda/2\}} (r_{h,l} - z_{h,l}) = 10 w_j + a_j - w_{j-1}, 1 \le j \le \lambda - 1,$$

$$C_\lambda = x_{\lambda/2}^2 - y_{\lambda/2}^2 = a_\lambda - w_{\lambda-1},$$

$$w_0, \ldots, w_\lambda \in \mathbb{N},$$

$$x_0 = \sum_{s=0,2,4,6,8} s \times u_0^s, x_h = \sum_{s=0}^{9} s \times u_h^s, h \in \{1,2,\ldots,\lambda/2\},$$

$$\sum_{s=0}^{9} u_h^s = 1, u_h^s \in \{0,1\}, s \in \{0,1,\ldots,9\}, h \in \{0,1,\ldots,\lambda/2\},$$

$$y_0 = \sum_{s=1,3,5,7,9} s \times v_0^s, y_h = \sum_{s=0}^{9} s \times v_h^s, h \in \{1,2,\ldots,\lambda/2\},$$

$$\sum_{s=0}^{9} v_h^s = 1, v_h^s \in \{0,1\}, s \in \{0,1,\ldots,9\}, h \in \{0,1,\ldots,\lambda/2\}$$

-continued $$100(u_h^s - 1) + sx_l \le r_{h,l}, 100(1 - u_h^s) +$$

$$sx_l \ge r_{h,l}, r_{h,l} \in \mathbb{N}, h, l \in \{0,1,\ldots,\lambda/2\}, s \in \{0,1,\ldots,9\}$$

$$100(v_h^s - 1) + sy_l \le z_{h,l}, 100(1 - v_h^s) +$$

$$sy_l \ge z_{h,l}, z_{h,l} \in \mathbb{N}, h, l \in \{0,1,\ldots,\lambda/2\}, s \in \{0,1,\ldots,9\}$$

For example, stage S136 includes:
obtaining a solution $(x_0, \ldots, x_{\lambda/2}; y_0, \ldots, y_{\lambda/2})$ from the subproblems.

For example, stage S138 includes:

$$\text{calculating } m = \sum_{j=0}^{\frac{\lambda}{2}} x_j \times 10^j, n = \sum_{j=0}^{\frac{\lambda}{2}} y_j \times 10^j,$$

$p_1 = m+n$, $q_2 = m-n$

Then, it goes to stage S118 for outputting, $p_1$ and $q_2$.

Herein, in the first mode, the two prime factors are determined as a form of $4m+1$ and $4n+1$, where m and n are different positive integers; in the second mode, the two prime factors are determined as a form of $4m+3$ and $4n+3$, where m and n are different positive integers; and, in the third mode, the two prime factors are determined as a form of $4m+1$ and $4n+3$, where m and n are different positive integers. Furthermore, in one embodiment, there are only three modes.

Table 3 shows the comparison of the LIP method of the present invention with existing RSA methods. To factorize a semi-prime number $\theta$ in $\lambda+2$ ($\lambda$ is even) digits, LIP uses decimals $a_0, a_1, \ldots, a_\lambda$ to construct constraint equations. Currently available RSA methods neglect to utilize these valuable decimals in their algorithms. Table 3 also indicates that LIP is an optimization-based approach, which is guaranteed to factorize $\theta$ into two prime factors, while other RSA methods are heuristic approach-based, which need to specify some parameters according to the property of $\theta$ and may not converge to a feasible solution. The systems and methods presented in the present invention for performing operations using linear integer programming for RSA factorization can significantly reduce the computer processing time as well as power consumption, required for private key decryption during digital communication. In one embodiment, employing the LIP Method provided by the present invention, the computer processing time for private key decryption can be reduced significantly as compared to other methods listed in Table 3.

TABLE 3

| | Comparison of LIP with current RSA methods | | |
| --- | --- | --- | --- |
| method | Trial division method | Special Quadratic Sieve Method | General Quadratic Sieve Method |
| note | An exhaustive brute force factorization. Least efficient. | A heuristic approach neglect using decimal digits of $\alpha_0, \alpha_1, \ldots, \alpha_\lambda$. Running time depends on the size of smallest prime factor. It may not converge to a feasible solution. | A heuristic approach neglect using decimal digits of $\alpha_0, \alpha_1, \ldots, \alpha_\lambda$. Running time depends on the size of $\theta$. It may not converge to a feasible solution. |
| feature | Need to pre-know all primes smaller than $\sqrt{\theta}$. | Need to fit properties of prime factors works best when two prime factors are close. Usually being applied before general quadratic | Need to specify and test hard smooth functions in the solution process. |

TABLE 3-continued

| | Comparison of LIP with current RSA methods | | |
| --- | --- | --- | --- |
| method | Trial division method | Special Quadratic Sieve Method | General Quadratic Sieve Method |
| | | sieve methods to remove small factors. | |
| | LIP Method provided by the present invention | | |
| note | An optimization approach, using decimal digits of $\alpha_0, \alpha_1, \ldots, \alpha_\lambda$ to form equations, with solving by linear integer programs. | | |
| feature | No need to pre-know primes. No need to specify extra parameters. No need to fit properties of prime factors. | | |

The system 100 can be applied to secure data transmissions in RSA encryption, such as public key encryption/decryption and digital signatures.

For public key encryption/decryption, during key generation, two large prime numbers are privately selected and multiplied together to create a semiprime number. This semiprime number becomes part of the public key, while the prime numbers are kept secret and contribute to the private key. The system 100 is utilized to generate these prime numbers. In the processes of encryption and decryption, the sender uses the recipient's public key to encrypt the message, and the recipient subsequently employs their private key to decrypt the message. If someone attempts to decrypt the message without the private key, they would need to factorize the semiprime number from the public key back into the original primes. This is a highly challenging and time-consuming computational problem, especially considering that the prime numbers used are typically very large. The system 100 can be used for determine the prime numbers for further determining the private key.

For digital signatures, the sender uses their private key to create a signature, and the recipient uses the sender's public key to verify it. The security of the signature relies on the difficulty of factorizing the semiprime number in the public key. The system 100 is employed to determine the private key for digital signatures.

In the present disclosure, spatial descriptions, such as "above," "on," "below," "up," "left," "right," "down," "top," "bottom," "vertical," "horizontal," "side," "upper," "over," "under," and so forth, are specified with respect to a certain component or group of components, or a certain plane of a component or group of components, to orient the component (s) as shown in the associated figure. The spatial descriptions used herein are for illustrative purposes only, and practical implementations of the structures described herein can be spatially arranged in any orientation or manner.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for reducing computer processing time during private key decryption during digital communication, the system performing operations using linear integer programming for RSA factorization, comprising:

an n/e extractor configured to extract a modulus and a public key exponent from a public key;

a prime factorization calculator electrically coupled with the n/e extractor and configured to:

determine a semi-prime number of the modulus according to the modulus;

use a tail digit and a head digit set of the semi-prime number of the modulus to perform decomposition and factorization with respect to the semi-prime number into two prime factors via one of a first mode, a second mode, and a third mode, wherein the tail digit represents the last or least significant digit of the semi-prime number, and the head digit set represents the first two or most significant digits of the semi-prime number; and a private key determiner electrically coupled with the prime factorization calculator and configured to determine a private key using the public key exponent and the two prime numbers; and a decryptor electrically coupled with the private key determiner and configured to decrypt an encrypted message using the private key, so as to generate a decrypted message;

wherein the prime factorization calculator is further configured to determine if the semi-prime number is in a form of 4k+1, k being a positive integer, wherein the decomposition and factorization is performed via the first mode as the semi-prime number is in the form of 4k+1, and the decomposition and factorization is performed via the third mode as the semi-prime number is not in the form of 4k+1;

wherein the prime factorization calculator performs the decomposition by creating subproblems that are structured as linear integer programming problems, using the tail digit and the head digit set of the semi-prime number as decimal digit information, and performs the factorization by solving corresponding linear binary programs derived from the decomposition, such that, during execution of the private key decryption on a computer, the system solves the subproblems using linear integer programming techniques to reduce computer processing time and power consumption.

2. The system of claim 1, wherein the two prime factors are determined at the third mode, if the performing the decomposition and factorization by the prime factorization calculator begins from the third mode, as a form of 4m+1 and 4n+3 by the prime factorization calculator, where m and n are different positive integers, and m is not equal to n.

3. The system of claim 1, wherein the prime factorization calculator is further configured to determine if the decomposition and factorization is performed via the second mode, after the prime factorization calculator performs decomposition and factorization via the first mode.

4. The system of claim 3, wherein the two prime factors are determined at the second mode, if performing the decomposition and factorization by the prime factorization calculator is via the second mode, as a form of 4m+3 and 4n+3 by the prime factorization calculator, where m and n are different positive integers, and m is not equal to n.

5. The system of claim 3, wherein the two prime factors are determined at the first mode, if determining by the prime factorization calculator is not to perform decomposition and factorization via the second mode, as a form of 4m+1 and 4n+1 by the prime factorization calculator, where m and n are different positive integers, and m is not equal to n.

6. The system of claim 1, further comprising a result presenter electrically couple with the decryptor and configured to:

extract relevant details from the decrypted message; and provide an interface to access and display the decrypted message.

7. A method for reducing computer processing time during private key decryption during digital communication, the method performing operations using linear integer programming for RSA factorization, comprising:

extracting a modulus and a public key exponent from a public key;

determining a semi-prime number of the modulus according to the modulus;

using a tail digit and a head digit set of the semi-prime number of the modulus to perform decomposition and factorization with respect to the semi-prime number into two prime factors via one of a first mode, a second mode, and a third mode, wherein the tail digit represents the last or least significant digit of the semi-prime number, and the head digit set represents the first two or most significant digits of the semi-prime number;

determining a private key using the public key exponent and the two prime numbers;

decrypting an encrypted message using the private key so as to generate a decrypted message; and determining if the semi-prime number is in a form of 4k+1, k being a positive integer, wherein the decomposition and factorization is performed via the first mode as the semi-prime number is in the form of 4k+1, and wherein the decomposition and factorization is performed via the third mode as the semi-prime number is not in the form of 4k+1;

wherein the decomposition comprises creating subproblems that are structured as linear integer programming problems using the tail digit and the head digit set of the semi-prime number as decimal digit information, and the factorization comprises solving corresponding linear binary programs derived from the decomposition, such that, during execution of the private key decryption on a computer, the subproblems are solved using linear integer programming techniques to reduce computer processing time and power consumption.

8. The method of claim 7, wherein the two prime factors are determined at the third mode, if the performing the decomposition and factorization begins from the third mode, as a form of 4m+1 and 4n+3, where m and n are different positive integers, and m is not equal to n.

9. The method of claim 7, further comprising:

determining if the decomposition and factorization is performed via the second mode, upon the performing decomposition and factorization via the first mode.

10. The method of claim 9, wherein the two prime factors are determined at the second mode, if the performing the decomposition and factorization is via the second mode, as a form of 4m+3 and 4n+3, where m and n are different positive integers, and m is not equal to n.

11. The method of claim 9, wherein the two prime factors are determined at the first mode, if the determining is not to perform decomposition and factorization via the second mode, as a form of 4m+1 and 4n+1, where m and n are different positive integers, and m is not equal to n.

12. The method of claim 7, further comprising:

extracting relevant details from the decrypted message; and providing an interface to access and display the decrypted message.

* * * * *